(12) United States Patent
Okamoto et al.

(10) Patent No.: US 7,884,155 B2
(45) Date of Patent: Feb. 8, 2011

(54) PROCESS FOR PRODUCING POLYBUTADIENE RUBBER AND RUBBER COMPOSITION

(75) Inventors: Naomi Okamoto, Ichihara (JP); Mitsuharu Anbe, Ichihara (JP); Jyun Yamashita, Ichihara (JP); Tetsuji Nakajima, Ichihara (JP); Takashi Kitamura, Ichihara (JP); Osamu Kimura, Ichihara (JP); Takashi Wada, Ichihara (JP)

(73) Assignee: Ube Industries, Ltd., Yamaguchi (JP)

( * ) Notice: Subject to any disclaimer, the term of this patent is extended or adjusted under 35 U.S.C. 154(b) by 597 days.

(21) Appl. No.: 10/596,757

(22) PCT Filed: Dec. 20, 2005

(86) PCT No.: PCT/JP2005/023377

§ 371 (c)(1),
(2), (4) Date: Jun. 23, 2006

(87) PCT Pub. No.: WO2006/054808

PCT Pub. Date: May 26, 2006

(65) Prior Publication Data

US 2007/0197714 A1    Aug. 23, 2007

(30) Foreign Application Priority Data

| Dec. 20, 2004 | (JP) | ............................. | 2004-367702 |
| Jan. 18, 2005 | (JP) | ............................. | 2005-010687 |
| Jan. 18, 2005 | (JP) | ............................. | 2005-010688 |
| Jan. 18, 2005 | (JP) | ............................. | 2005-010689 |
| Jan. 18, 2005 | (JP) | ............................. | 2005-010690 |
| Jan. 18, 2005 | (JP) | ............................. | 2005-010691 |
| Jan. 18, 2005 | (JP) | ............................. | 2005-010692 |
| Jan. 18, 2005 | (JP) | ............................. | 2005-010693 |
| Jun. 17, 2005 | (JP) | ............................. | 2005-177170 |
| Jun. 17, 2005 | (JP) | ............................. | 2005-177171 |
| Jun. 17, 2005 | (JP) | ............................. | 2005-177172 |

(51) Int. Cl.
  *C08K 3/34* (2006.01)
(52) U.S. Cl. .................................................. 524/493
(58) Field of Classification Search .................. 524/493
  See application file for complete search history.

(56) References Cited

U.S. PATENT DOCUMENTS

| 3,935,180 | A |   | 1/1976  | Sugiura et al. |
| 4,196,106 | A |   | 4/1980  | Matsuura et al. |
| 4,196,406 | A |   | 4/1980  | Salem |
| 4,379,889 | A | * | 4/1983  | Ashitaka et al. ............ 525/247 |
| 4,421,891 | A |   | 12/1983 | Miyake et al. |
| 5,468,822 | A |   | 11/1995 | Tsujimoto et al. |
| 5,559,172 | A |   | 9/1996  | Kulich et al. |
| 5,580,919 | A |   | 12/1996 | Agostini et al. |
| 6,211,278 | B1 |  | 4/2001  | Vanel |
| 6,300,450 | B1 |  | 10/2001 | Tsujimoto et al. |
| 6,303,692 | B1 |  | 10/2001 | Luo |
| 6,350,807 | B1 |  | 2/2002  | Blok et al. |
| 6,664,347 | B2 |  | 12/2003 | Suzuki et al. |
| 7,700,691 | B2 |  | 4/2010  | Asakura et al. |
| 2002/0170642 | A1 | | 11/2002 | Westermann et al. |
| 2005/0070623 | A1 | | 3/2005  | Takase et al. |
| 2008/0233399 | A1 | | 9/2008  | Asakura et al. |

FOREIGN PATENT DOCUMENTS

| EP | 0645424 | A1 |   | 3/1995 |
| EP | 1693411 | A1 |   | 8/2006 |
| JP | 4917666 |    |   | 5/1974 |
| JP | 4917667 |    |   | 5/1974 |
| JP | 5345347 | A  |   | 4/1978 |
| JP | 55-31802 | A |   | 3/1980 |
| JP | 5730856 | B2 |   | 4/1980 |
| JP | 56109205 | A | * | 8/1981 |
| JP | 61073707 | A |   | 4/1986 |
| JP | 62171 | B2 |     | 1/1987 |
| JP | 6336324 | B2 |   | 7/1988 |
| JP | 2037927 | B2 |   | 8/1990 |
| JP | 2038081 | B2 |   | 8/1990 |
| JP | 3045609 | A |    | 2/1991 |
| JP | 363566 | B2 |    | 10/1991 |

(Continued)

OTHER PUBLICATIONS

Translation of JP56109205, Aug. 1981.*

(Continued)

*Primary Examiner*—Ling-Siu Choi
*Assistant Examiner*—Hui Chin
(74) *Attorney, Agent, or Firm*—Panitch Schwarze Belisario & Nadel LLP

(57) ABSTRACT

A process for producing a vinyl-cis-polybutadiene rubber, including mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization; and (B) cis-polybutadiene obtained by a step of adding the foregoing cis-1,4-polymerization catalyst, thereby subjecting the 1,3-butadiene to cis-1,4-polymerization and a rubber composition containing the resulting rubber.

19 Claims, No Drawings

FOREIGN PATENT DOCUMENTS

| | | | |
|---|---|---|---|
| JP | 04085304 A | | 3/1992 |
| JP | 448815 B2 | | 8/1992 |
| JP | 5194658 A | | 8/1993 |
| JP | 05194658 A | * | 8/1993 |
| JP | 6025355 A | | 2/1994 |
| JP | 06228370 A | | 8/1994 |
| JP | 7315014 A | | 12/1995 |
| JP | 8311246 A | | 11/1996 |
| JP | 11-240981 A | | 9/1999 |
| JP | 11240981 A | | 9/1999 |
| JP | 2000044633 A | | 2/2000 |
| JP | 2000-256507 A | | 9/2000 |
| JP | 2001-294614 A | | 10/2001 |
| JP | 2001302730 A | | 10/2001 |
| JP | 2002338740 A | | 11/2002 |
| JP | 2003041064 A | | 2/2003 |
| JP | 2004-59740 A | | 2/2004 |
| JP | 2004244427 A | | 9/2004 |
| JP | 20058817 A | | 1/2005 |
| JP | 2005206702 A | | 8/2005 |
| KR | 199634289 A | | 10/1996 |
| KR | 2001111018 A | | 12/2001 |
| RU | 2214427 C2 | | 10/2003 |
| TW | 442523 B | | 6/2001 |
| TW | 467942 B | | 12/2001 |
| TW | 475938 B | | 2/2002 |
| TW | 562817 B | | 11/2003 |
| WO | 03040231 A1 | | 5/2003 |
| WO | 2005056663 A1 | | 6/2005 |

OTHER PUBLICATIONS

Translation of JP 05194658, Aug. 3, 1993.*
"Encyclopedia of Polymers", Sovietskaya entsiklopediya Publishers, vol. 1, pp. 1010, 1012, and 1014 (1972).
"Khimicheskaya Entsiclopediya (Chemical Encyclopaedia—in Russian)";Bolshaya Rossiyskaya Entsiclopediya Scientific Publishers; Moscow; vol. 4; pp. 183-184; (1995).
Russian Office Action (with English Translation); May 28, 2009; Concerning Russian Application No. 2007123019/04 (025066).
Chinese Office Action (with English translation) dated Jun. 5, 2009 concerning Chinese Application No. 200580043928.7.
Chinese Office Action dated Nov. 6, 2009 concerning Chinese Application No. 200580043921.5.
Chinese Office Action (with English translation) dated Nov. 6, 2009 concerning Chinese Application No. 200580043921.5.
Book excerpt regarding rubber material characteristics, pp. 17-19 (2003).
Excerpt from Rubber Material Performance and Design Application, Section 4 Polybutadiene Rubber, pp. 17-19 (2003) (with English abstract).
Office Action issued May 24, 2010 in related U.S. Appl. No. 12/714,964.
Chinese Office Action issued May 12, 2010 (with English translation).
Canadian Office Action issued May 21, 2010 in Canadian Application No. 2,591,712.
Indian Office Action issued Jun. 16, 2010 in Indian Application No. 3100/DELNP/2006.
Chinese Office Action (with English translation) issued Jul. 5, 2010 in Chinese Patent Application No. 200580043928.7.
U.S. Office Action issued Jun. 23, 2010 in U.S. Appl. No. 10/596,755.
Mexican Office Action (with English translation) issued Jun. 14, 2010 in Mexican Patent Application No. MX/a/2007/007522.
European Office Action issued Aug. 31, 2010 in European Application No. 05 820 043.7 - 1214.
EP Office Action issued Sep. 20, 2010 from the European Patent Office in European Application No. 05 820 040.3.

* cited by examiner

US 7,884,155 B2

PROCESS FOR PRODUCING POLYBUTADIENE RUBBER AND RUBBER COMPOSITION

CROSS-REFERENCE TO RELATED APPLICATION

This application is a section 371 of International Application No. PCT/JP2005/023377, filed Dec. 20, 2005, which was published in the Japanese language on May 26, 2006, under International Publication No. WO 2006/054808 A1 and the disclosure of which is incorporated herein by reference.

TECHNICAL FIELD

The present invention relates to a process for producing a vinyl-cis-polybutadiene rubber and in particular, to a process for producing a vinyl-cis-polybutadiene rubber having excellent extrusion processability, tensile stress and flex crack growth resistance, which is suitable for automobile tire members, especially sidewalls, and to a rubber composition using the subject rubber.

Also, the invention relates to a rubber composition for sidewalls made of novel vinyl-cis-polybutadiene, which has a small die swell and excellent extrusion processability and which is capable of improving low fuel consumption with respect to a vulcanizate thereof.

Also, the invention relates to a silica compounded rubber composition suitable for tire cap treads, which has a small die swell and excellent extrusion processability while keeping excellent wet skid performance, exothermic characteristic and abrasion resistance as required for the performance of tires such as safety and economy.

Also, the invention relates to a passenger automobile tire using, as a cap tread rubber, a rubber composition having a small die swell and excellent extrusion processability while keeping a high elastic modulus.

Also, the invention relates to a rubber composition for internal members of tire such as tire coating rubbers inclusive of carcasses and belts, which has a small die swell, excellent extrusion processability and satisfactory adhesiveness to metals.

Also, the invention relates to a rubber composition for base treads and more specifically, to a rubber composition for base treads made of novel vinyl-cis-polybutadiene capable of making both internal exothermic characteristics of a tire and extrusion processability compatible with each other in a good balance.

Also, the invention relates to a high-hardness compounded rubber composition and more specifically, to a rubber composition suitable for beads and chafers of tire, which has improved dimensional stability (die swell is small) at the time of extrusion processing or durability while keeping a high hardness.

Also, the invention relates to a rubber composition for large-sized vehicle tires using a rubber composition for a cap tread rubber, which has a small die swell and excellent extrusion processability while keeping high elasticity.

The rubber composition of the invention which is used in a tire can be further used for tire members such as tire sidewalls, cap treads, side reinforcing layers of run flat tire, carcasses, belts, chafers, base treads, beads, stiffners, and inner liners; industrial products such as rubber vibration insulators, hoses, belts, rubber rolls, rubber coolers, and shoe sole rubbers; and other composites, adhesives, plastic modifiers, and so on.

BACKGROUND ART

Polybutadiene has a so-called microstructure in which a binding segment formed by polymerization at the 1,4-positions (1,4-structure) and a binding segment formed by polymerization at the 1,2-positions (1,2-structure) are copresent in the molecular chain. The 1,4-structure is further classified into a cis-structure and a trans-structure. On the other hand, the 1,2-structure takes a structure containing a vinyl group as a side chain.

Hitherto, a production process of a vinyl-cis-polybutadiene rubber composition has been carried out in an aromatic hydrocarbon-based solvent such as benzene, toluene, and xylene. When such a solvent is used, since the viscosity of a polymerization solution is high, there were problems in stirring, heat transfer, delivery, and so on, and excessive energy was required for recovering the solvent.

As the foregoing production process, there is known a process in which 1,3-butadiene is subjected to cis-1,4-polymerization in the foregoing inert organic solvent by using a catalyst obtainable from water, a soluble cobalt compound and an organoaluminum chloride represented by the general formula, $AlR_nX_{3-n}$, (wherein R represents an alkyl group having from 1 to 6 carbon atoms, a phenyl group, or a cycloalkyl group; X represents a halogen atom; and n represents a numeral of from 1.5 to 2) to produce BR, and 1,3-butadiene is then subjected to syndiotactic 1,2-polymerization (hereinafter abbreviated as "1,2-polymerization") in the presence of a catalyst obtainable from a soluble cobalt compound, an organoaluminum compound represented by the general formula, $AlR_3$ (wherein R represents an alkyl group having from 1 to 6 carbon atoms, a phenyl group or a cycloalkyl group) and carbon disulfide by adding or not adding 1,3-butadiene and/or the foregoing solvent to this polymerization system (see, for example, JP-B-49-17666 (Patent Document 1) and JP-B-49-17667 (Patent Document 2)).

Furthermore, for example, JP-B-62-171 (Patent Document 3), JP-B-63-36324 (Patent Document 4), JP-B-2-37927 (Patent Document 5), JP-B-2-38081 (Patent Document 6) and JP-B-3-63566 (Patent Document 7) describe a process in which the production is carried out by subjecting 1,3-butadiene to cis-1,4-polymerization in the presence or absence of carbon disulfide, or after the production, 1,3-butadiene and carbon disulfide are separated and recovered, thereby circulating 1,3-butadiene not substantially containing carbon disulfide or the foregoing inert organic solvent. In addition, JP-B-4-48815 (Patent Document 8) describes a rubber composition having excellent tensile stress and flex crack growth resistance, in which a compounded material thereof has a small die swell ratio and a vulcanizate thereof is suitable as a sidewall of tire.

Furthermore, JP-A-2000-44633 (Patent Document 9) describes a process in which the production is carried out in an inert organic solvent containing, as the major component, a C4 fraction such as n-butane, cis-2-butene, trans-2-butene, and butene-1. It is described that in this process, 1,2-polybutadiene contained in the rubber composition is a short fiber crystal, and the distribution of the major axis length of the short fiber crystal is such that 98% or more of the fiber length is less than 0.6 μm and 70% or more thereof is less than 0.2 μm. Also, it is described that in the resulting rubber composition, the moldability, tensile stress, tensile strength and flex crack growth resistance of a cis-1,4-polybutadiene rubber (hereinafter abbreviated as "BR") are improved.

However, it is desired that not only the moldability is further enhanced, but also various characteristics are improved depending upon the utility. Furthermore, the foregoing vinyl-cis-polybutadiene rubber involved such a defect that it is inferior to usual high cis-polybutadiene with respect to exothermic characteristics and rebound resilience.

Furthermore, in general, it is known that a proportion of the tire rolling resistance occupying in the running resistance which largely affects the fuel consumption of an automobile is large and that the affect due to an energy loss of sidewall rubber is relatively large. For that reason, rubbers having a low dissipation factor such as natural rubbers, isoprene rubbers, butadiene rubbers, and mixtures thereof have hitherto been used in the sidewall part. However, it is required that the rolling resistance of tire is further improved.

As a method for reducing the dissipation factor of the sidewall rubber, the use of carbon black having low reinforcing properties or a reduction of the compounding amount of carbon black may be thought. However, there is encountered such a problem that the die swell at the time of extrusion processing becomes large, and therefore, it is difficult to make the thickness of the sidewall member thin or to realize an enhancement of uniformity of tire. For that reason, there is demanded a method for realizing low fuel consumption while keeping a small die swell with respect to an extrudate thereof.

Furthermore, in general, with respect to the performance of automobile tire, there are required excellent wet skid properties as a braking characteristic and excellent rolling resistance (tan δ) or abrasion resistance as a fuel consumption characteristic. However, it is known that these characteristics are in an antinomy relation with each other. In recent years, though there has been made a proposal to compound silica having excellent wet skid properties, thereby highly balancing the foregoing characteristics, such is not satisfactory yet. It is known that though the silica compounding is excellent in the wet skid properties and fuel consumption properties, the abrasion resistance and processability are lowered. While the abrasion resistance is improved by the use of high cis-BR, there is some possibility that the wet skid properties are lowered, and therefore, improvements were demanded.

Furthermore, in general, tires are required to have excellent drivability and durability and so on. In particular, from the standpoint of safety, the tires are required to have excellent wet skid resistance on a wet road surface. Moreover, on the basis of social requirements for realizing conservation of natural resources in recent years, tires having a low rolling resistance, namely tires with a low energy loss, are being researched and developed. While the energy loss of tire as consumed by free rotation varies depending upon the tire structure, etc., about a half of the whole energy is consumed in the tread part. Accordingly, if the energy loss of the tread rubber is reduced, a tire with a low energy loss at the time of rolling is obtained.

Then, it is attempted to modify the tread rubber such that the energy loss is low. However, such modification of the rubber tends to lower the wet skid properties. Since an improvement of the rolling resistance and an improvement of the wet skid properties generally contradict to each other, various designs for the improvements in the tire structure are attempted in order to make them compatible with each other. As one of the designs, there is enumerated a method for forming a tread into two layers consisting of a cap tread and a base tread. That is, this method is to form the tread into two layers of a cap tread with excellent wet skid properties and a base tread with a low energy loss, thereby not only enhancing the wet skid properties of tire as a whole but also lowering the energy loss.

The rubber for cap tread is required to have a high elastic modulus and molding stability derived from the abrasion resistance and high-speed running properties in addition to the wet skid properties. As a method for obtaining a rubber with a high elastic modulus, various methods have hitherto been attempted. The method for compounding a large amount of carbon black is not preferable because unification of rubbers is poor in the processing step, an electrical power load increases at the time of kneading or extrusion, and ML of the compounded material becomes large, whereby difficulty is accompanied at the time of extrusion molding. The method for compounding a large amount of sulfur involves such defects that sulfur causes blooming and that the crack growth becomes fast due to an increase of the degree of crosslinking. With respect to the addition of a thermosetting resin, since the thermosetting resin is low in compatibility with usually used natural rubbers or diene-based rubbers, when a large amount of the thermosetting resin is compounded, satisfactory dispersion is hardly obtained. Furthermore, since this mixed compound is hard even in an unvulcanized state, the load may become large in kneading or extrusion, or the molding processability of tire may be deteriorated. In a method for merely blending and compounding single fibers, since binding between short fibers and the rubber is insufficient, creep may become large, or fatigue life may be lowered.

As the rubber for base tread, a rubber with low exothermic characteristics is required. Examples of rubbers with low exothermic characteristics include natural rubbers, isoprene rubbers, and cis-1,4-polybutadiene rubbers, and compounded materials of such a rubber with carbon black are used. In order to reveal low exothermic characteristics by other materials than rubbers, it may be thought to use carbon black having a large particle size and low reinforcing properties or to lower the compounding amount of carbon black. However, these methods involve such problems that the elastic modulus or fatigue resistance of rubber is lowered and that the die swell becomes large. Furthermore, there is a method for revealing low exothermic characteristics by compounding short fibers of nylon or vinylon, thereby making the rubber have a high elastic modulus. However, since these short fibers are insufficient in adhesion to rubbers, there is encountered a problem that the fatigue life is short.

On the other hand, when a cap/base system is employed in passenger automobile tires, at the time of co-extrusion of a cap tread and a base tread, there is caused a problem that an extrudate is warped because of a difference in die swell between the both members. If the die swell of the base tread rubber is made small, this problem is liable to be solved. If a large amount of carbon black with high reinforcing properties is compounded, though the die swell become small, the heat generation becomes large. Thus, a method which is satisfied with the die swell and low heat generation at the same time is desired.

Furthermore, in general, in radial tires, a steel cord is used in view of high-speed durability and high-speed drivability. In the case of using a steel cord, a very large strain is liable to be gathered in a rubber in the vicinity of the steel cord at the time of running of tire. Accordingly, the rubber for steel cord is required to have a high elastic modulus and excellent adhesiveness to metals. Even in radial tires or bias tires using an organic fiber cord, rubbers having a high elastic modulus are preferable as the rubber for cord from the viewpoint of durability.

As a method for obtaining a rubber with a high elastic modulus, various methods have hitherto been attempted. The method for compounding a large amount of carbon black is not preferable because unification of rubbers is poor in the processing step, an electrical power load increases at the time of kneading or extrusion, and ML of the compounded material becomes large, whereby difficulty is accompanied at the time of extrusion molding. The method for compounding a large amount of sulfur involves such defects that sulfur causes blooming and that the crack growth becomes fast due to an increase of the degree of crosslinking. With respect to the addition of a thermosetting resin, since the thermosetting resin is low in compatibility with natural rubbers or diene-based rubbers as usually used as a cord coating rubber, dispersion failure likely occurs, and crack resistance is deteriorated. Furthermore, conventionally known tire cord coating rubber compositions are small in green strength. Thus, materials having a large green strength are required in view of molding processability.

Furthermore, in general, as rubber members to be disposed in the surroundings of tire bead, high-hardness rubbers are used. Examples thereof include a rubber composition having an increased compounding amount of carbon black and a rubber composition having a novolak type phenol resin compounded therein (see JP-B-57-30856) and a rubber composition having short fibers and an olefin-based resin compounded therein (see JP-A-7-315014).

With respect to a method for obtaining a high-hardness rubber composition, it is general to increase carbon black or to compound a fiber, a resin, etc. However, in all of these methods, there may be the case where the heat generation at the time of repeated deformation becomes large, whereby the durability and fatigue resistance are lowered. Thus, improvements are required.

Patent Document 1: JP-B-49-17666
Patent Document 2: JP-B-49-17667
Patent Document 3: JP-B-62-171
Patent Document 4: JP-B-63-36324
Patent Document 5: JP-B-2-37927
Patent Document 6: JP-B-2-38081
Patent Document 7: JP-B-3-63566
Patent Document 8: JP-B-4-48815
Patent Document 9: JP-A-2000-44633

DISCLOSURE OF THE INVENTION

Problems that the Invention is to Solve

An object of the invention is to provide a process for producing a vinyl-cis-polybutadiene rubber which is further enhanced with respect to extrusion processability and tensile stress which are excellent characteristics of conventional vinyl-cis-polybutadiene, is improved with respect to exothermic characteristics and rebound resilience, and exhibits excellent properties as a material for automobile tire and a rubber composition using the same.

Also, an object of the invention is to obtain a rubber composition for sidewall having low fuel consumption with respect to a vulcanizate thereof and having a small die swell.

Also, an object of the invention is to obtain a silica compounded rubber composition for tire having excellent extrusion processability and having satisfactory wet skid properties and abrasion resistance while keeping a high elastic modulus.

Also, an object of the invention is to obtain a tire for passenger automobile having excellent extrusion molding processability and having good high-speed running properties, grip properties on a wet road surface and abrasion resistance by using a rubber composition for cap tread having excellent extrusion processability while keeping a high elastic modulus.

Also, an object of the invention is to obtain a rubber composition for tire cord coating of carcasses, belts, beads, etc. having a small die swell, a large green strength and excellent molding processability and having a large elastic modulus with respect to a vulcanizate thereof.

Also, an object of the invention is to obtain a rubber composition for base tread having low exothermic characteristics with respect to a vulcanizate thereof and having a small die swell.

Also, an object of the invention is to provide a rubber composition capable of improving dimensional stability at the time of extrusion processing and durability with respect to a tire thereof while keeping a high hardness.

Also, an object of the invention is to obtain a rubber composition for large-sized vehicle having excellent moldability and having good high-speed running properties, wet skid properties and abrasion resistance by using a rubber composition for cap tread having a small die swell and excellent extrusion processability while keeping a high elastic modulus.

Means for Solving the Problems

The invention is as follows.

(1) A process for producing a vinyl-cis-polybutadiene rubber, which comprises mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization; and (B) cis-polybutadiene obtained by a step of adding the foregoing cis-1,4-polymerization catalyst, thereby subjecting the 1,3-butadiene to cis-1,4-polymerization.

(2) A process for producing a vinyl-cis-polybutadiene rubber, which comprises mixing (A) a vinyl-cis-polybutadiene solution obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization; and (B) a cis-polybutadiene solution obtained by a step of dissolving cis-polybutadiene containing 80% or more of a cis-1,4-bond and having a Mooney viscosity ($ML_{1+4}$ at 100° C.) of from 20 to 80 in a mixture containing 1,3-butadiene and/or a hydrocarbon-based organic solvent as the major component.

(3) A process for producing a vinyl-cis-polybutadiene rubber, which comprises mixing (A) a vinyl-cis-polybutadiene solution obtained by (1) a step of dissolving cis-polybutadiene containing 80% or more of a cis-1,4-bond and having a Mooney viscosity ($ML_{1+4}$ at 100° C.) of from 20 to 80 in a mixture containing 1,3-butadiene and a hydrocarbon-based organic solvent as the major components and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting cis-polybutadiene solution, thereby subjecting the 1,3-butadiene to 1,2-polymerization; and (B) cis-polybutadiene obtained by a step of adding the foregoing cis-1,4-polymerization catalyst, thereby subjecting the 1,3-butadiene to cis-1,4-polymerization.

(4) A process for producing a vinyl-cis-polybutadiene rubber, which comprises mixing (A) a vinyl-cis-polybutadiene solution obtained by (1) a step of dissolving cis-polybutadiene containing 80% or more of a cis-1,4-bond and having a Mooney viscosity ($ML_{1+4}$ at 100° C.) of from 20 to 80 in a mixture containing 1,3-butadiene and a hydrocarbon-based organic solvent as the major components and having an adjusted water content and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting cis-polybutadiene solution, thereby subjecting the 1,3-butadiene to 1,2-polymerization; and (B) cis-polybutadiene obtained by a step of adding the foregoing cis-1,4-polymerization catalyst, thereby subjecting the 1,3-butadiene to cis-1,4-polymerization.

(5) A process for producing a vinyl-cis-polybutadiene rubber, which comprises mixing (A) a vinyl-cis-polybutadiene solution obtained by (1) a step of dissolving cis-polybutadiene containing 80% or more of a cis-1,4-bond and having a Mooney viscosity ($ML_{1+4}$ at 100° C.) of from 20 to 80 in a mixture containing 1,3-butadiene and a hydrocarbon-based organic solvent as the major components and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting cis-polybutadiene solution, thereby subjecting the 1,3-butadiene to 1,2-polymerization; and (B) a cis-polybutadiene solution obtained by a step of dissolving cis-polybutadiene containing 80% or more of a cis-1,4-bond and having a Mooney viscosity ($ML_{1+4}$ at 100° C.) of from 20 to 80 in a mixture containing 1,3-butadiene and/or a hydrocarbon-based organic solvent as the major component.

(6) A process for producing a vinyl-cis-polybutadiene rubber, which comprises mixing (A) a vinyl-cis-polybutadiene solution obtained by (1) dissolving cis-polybutadiene containing 80% or more of a cis-1,4-bond and having a Mooney viscosity ($ML_{1+4}$ at 100° C.) of from 20 to 80 in a mixture containing 1,3-butadiene and a hydrocarbon-based organic solvent as the major components and having an adjusted water content and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting cis-polybutadiene solution, thereby subjecting the 1,3-butadiene to 1,2-polymerization; and (B) a cis-polybutadiene solution obtained by a step of dissolving cis-polybutadiene containing 80% or more of a cis-1,4-bond and having a Mooney viscosity ($ML_{1+4}$ at 100° C.) of from 20 to 80 in a mixture containing 1,3-butadiene and/or a hydrocarbon-based organic solvent as the major component.

(7) The process for producing a vinyl-cis-polybutadiene rubber as set forth above in any one of (1) to (6), wherein the polymerization temperature for a step of subjecting the 1,3-butadiene to 1,2-polymerization in the subject (A) (2) is from −5 to 50° C.

(8) The process for producing a vinyl-cis-polybutadiene rubber as set forth above in any one of (1) to (7), wherein a proportion (HI) of a boiling n-hexane insoluble matter of the vinyl-cis-polybutadiene obtained in the subject (A) is from 10 to 60% by weight.

(9) The process for producing a vinyl-cis-polybutadiene rubber as set forth above in (1), wherein a viscosity in a 5% toluene solution (Tcp) of the cis-polybutadiene obtained in a step of subjecting to cis-1,4-polymerization in the subject (A)(1) is from 150 to 250.

(10) The process for producing a vinyl-cis-polybutadiene rubber as set forth above in (2), wherein the cis-polybutadiene in the subject (B) is used as a single kind or a blend of two or more kinds of cis-polybutadiene synthesized by using a cobalt catalyst or a nickel catalyst or a lanthanoid catalyst.

(11) The process for producing a vinyl-cis-polybutadiene rubber as set forth above in (3) or (4), wherein the cis-polybutadiene in the subject (A) is used as a single kind or a blend of two or more kinds of cis-polybutadiene synthesized by using a cobalt catalyst or a nickel catalyst or a lanthanoid catalyst.

(12) The process for producing a vinyl-cis-polybutadiene rubber as set forth above in (5) or (6), wherein the cis-polybutadiene in the subject (A) and (B) is used as a single kind or a blend of two or more kinds of cis-polybutadiene synthesized by using a cobalt catalyst or a nickel catalyst or a lanthanoid catalyst.

(13) The process for producing a vinyl-cis-polybutadiene rubber as set forth above in (2), including a step of dissolving at least one member of previously polymerized polyisoprene, liquid polyisoprene, crystalline polybutadiene having a melting point of not higher than 150° C., liquid polybutadiene, a styrene-isoprene-styrene compound, and derivatives thereof in a mixture containing 1,3-butadiene and a hydrocarbon-based solvent as the major components prior to the cis-1,4-polymerization or 1,2-polymerization in the subject (A) (1).

(14) The process for producing a vinyl-cis-polybutadiene rubber as set forth above in any one of (3) to (6), including a step of dissolving at least one member of previously polymerized polyisoprene, liquid polyisoprene, crystalline polybutadiene having a melting point of not higher than 150° C., liquid polybutadiene, a styrene-isoprene-styrene compound, and derivatives thereof in a mixture containing 1,3-butadiene and a hydrocarbon-based solvent as the major components prior to initiation of the 1,2-polymerization in the subject (A) (1).

(15) A rubber composition comprising 100 parts by weight of a rubber component containing the vinyl-cis-polybutadiene rubber as set forth above in any one of (1) to (14) having from 10 to 100 parts by weight of a rubber reinforcing agent compounded therein.

(16) A rubber composition for sidewall comprising 100 parts by weight of a rubber component made of (a) from 20 to 80% by weight of a vinyl-cis-polybutadiene rubber resulting from solution mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization and (B) cis-polybutadiene obtained by a step of adding the foregoing cis-1,4-polymerization catalyst, thereby subjecting the 1,3-butadiene to cis-1,4-polymerization, and (b) from 80 to 20% by weight of a diene-based rubber other than (a); and (c) from 25 to 60 parts by weight of a rubber reinforcing agent.

(17) A silica compounded rubber composition for tire comprising 100 parts by weight of a rubber component made of (a) from 20 to 80% by weight of a vinyl-cis-polybutadiene rubber resulting from solution mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization and (B) cis-polybutadiene obtained by a step of adding the foregoing cis-1,4-polymerization catalyst, thereby subjecting the 1,3-butadiene to cis-1,4-polymerization, and (b) from 80 to 20% by weight of a diene-based rubber other than (a); and (c) from 40 to 100 parts by weight of a rubber reinforcing agent containing 40% or more of silica.

(18) A rubber composition for passenger automobile tire comprising 100 parts by weight of a rubber component made of (a) from 10 to 50% by weight of a vinyl-cis-polybutadiene rubber resulting from solution mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization and (B) cis-polybutadiene obtained by a step of adding the foregoing cis-1,4-polymerization catalyst, thereby subjecting the 1,3-butadiene to cis-1,4-polymerization, (d) from 30 to 70% by weight of a styrene-butadiene rubber, and (b) from 0 to 60% by weight of a diene-based rubber other than (a) and (d); and (c) from 40 to 100 parts by weight of a rubber reinforcing agent.

(19) A rubber composition for tire cord coating comprising 100 parts by weight of a rubber component made of (a) from 10 to 60% by weight of a vinyl-cis-polybutadiene rubber resulting from solution mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization and (B) cis-polybutadiene obtained by a step of adding the foregoing cis-1,4-polymerization catalyst, thereby subjecting the 1,3-butadiene to cis-1,4-polymerization, and (b) from 90 to 40% by weight of a diene-based rubber other than (a); and (c) from 30 to 80 parts by weight of a rubber reinforcing agent.

(20) A rubber composition for base tread comprising 100 parts by weight of a rubber component made of (a) from 20 to 80% by weight of a vinyl-cis-polybutadiene rubber resulting from solution mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization and (B) cis-polybutadiene obtained by a step of adding the foregoing cis-1,4-polymerization catalyst, thereby subjecting the 1,3-butadiene to cis-1,4-polymerization, and (b) from 80 to 20% by weight of a diene-based rubber other than (a); and (c) from 22 to 55 parts by weight of a rubber reinforcing agent.

(21) A high-hardness compounded rubber composition comprising 100 parts by weight of a rubber component made of (a) from 20 to 80% by weight of a vinyl-cis-polybutadiene rubber resulting from solution mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization and (B) cis-polybutadiene obtained by a step of adding the foregoing cis-1,4-polymerization catalyst, thereby subjecting the 1,3-butadiene to cis-1,4-polymerization, and (b) from 80 to 20% by weight of a diene-based rubber other than (a); and (c) from 60 to 100 parts by weight of a rubber reinforcing agent.

(22) A rubber composition for large-sized vehicle tire comprising 100 parts by weight of a rubber component made of (a) from 10 to 60% by weight of a vinyl-cis-polybutadiene rubber resulting from solution mixing (A) vinyl-cis-polybutadiene obtained by (1) a step of adding a cis-1,4-polymerization catalyst obtainable from an organoaluminum compound and a soluble cobalt compound to a mixture containing 1,3-butadiene and a hydrocarbon-based organic solvent as the major components and having an adjusted water content, thereby subjecting the 1,3-butadiene to cis-1,4-polymerization and subsequently, (2) a step of making a catalyst obtainable from a soluble cobalt compound, an organoaluminum compound represented by the general formula, $AlR_3$ (wherein R represents an alkyl group having from 1 to 6 carbon atoms, a phenyl group, or a cycloalkyl group), and carbon disulfide present in the resulting polymerization reaction mixture, thereby subjecting the 1,3-butadiene to 1,2-polymerization and (B) cis-polybutadiene obtained by a step of adding the foregoing cis-1,4-polymerization catalyst, thereby subjecting the 1,3-butadiene to cis-1,4-polymerization, and (b) from 90 to 40% by weight of a diene-based rubber other than (a); and (c) from 45 to 70 parts by weight of a rubber reinforcing agent.

(23) The rubber composition as set forth above in any one of (16) to (22), wherein in the production step of the vinyl-cis-polybutadiene rubber (a), the polymerization temperature for a step of subjecting the 1,3-butadiene to 1,2-polymerization in the subject (A) (2) is from −5 to 50° C.

(24) The rubber composition as set forth above in any one of (16) to (22), wherein in the production step of the vinyl-cis-polybutadiene rubber (a), a proportion (HI) of a boiling n-hexane insoluble matter of the vinyl-cis-polybutadiene obtained in the subject (A) is from 10 to 60% by weight.

(25) The rubber composition as set forth above in any one of (16) to (22), wherein in the vinyl-cis-polybutadiene rubber (a), a viscosity in a 5% toluene solution (Tcp) of the cis-polybutadiene obtained in a step of subjecting to cis-1,4-polymerization in the subject (A) (1) is from 150 to 250.

(26) The rubber composition as set forth above in any one of (16), (18), (19), (20), (21) or (22), wherein the diene-based rubber (b) other than (a) is a natural rubber and/or polyisoprene.

(27) The rubber composition as set forth above in (17), wherein the diene-based rubber (b) other than (a) is a natural rubber and/or polyisoprene and/or a styrene-butadiene rubber.

(28) The rubber composition as set forth above in any one of (16) to (22), wherein the rubber reinforcing agent (c) is carbon black.

ADVANTAGES OF THE INVENTION

According to the invention, as compared with the conventional vinyl-cis-polybutadiene rubber, vinyl-cis-polybutadiene having satisfactory processability and having excellent exothermic characteristics and rebound resilience can be produced. When the vinyl-cis-polybutadiene obtained by the invention is used for tire application, in the production step, the workability of tire manufacture is enhanced due to its excellent extrusion processability so that it becomes possible to realize low fuel consumption of the completed tire.

Also, according to the invention, it is possible to provide a rubber composition for sidewall having low fuel consumption with respect to a vulcanizate thereof and having a small die swell.

Also, according to the invention, it is possible to provide a silica compounded rubber composition for tire having excellent extrusion processability and having satisfactory wet skid properties and abrasion resistance while keeping a high elastic modulus.

Also, according to the invention, it is possible to provide a tire for passenger automobile having excellent extrusion molding processability and having satisfactory high-speed running properties, grip properties on a wet road surface and abrasion resistance by using a rubber composition for cap tread having excellent extrusion processability while keeping a high elastic modulus.

Also, according to the invention, it is possible to provide a rubber composition for tire cord coating of carcasses, belts, beads, etc. having a small die swell, a large green strength and excellent molding processability and having a large elastic modulus with respect to a vulcanizate thereof.

Also, according to the invention, it is possible to provide a rubber composition for base tread having low exothermic characteristics with respect to a vulcanizate thereof and having a small die swell.

Also, according to the invention, it is possible to provide a rubber composition capable of improving dimensional stability at the time of extrusion processing and durability with respect to a tire thereof while keeping a high hardness.

Also, according to the invention, it is possible to provide a rubber composition for large-sized vehicle having excellent moldability and having satisfactory high-speed running properties, wet skid properties and abrasion resistance by using a rubber composition for cap tread having a small die swell and excellent extrusion processability while keeping a high elastic modulus.

BEST MODES FOR CARRYING OUT THE INVENTION

(A) Production of vinyl-cis-polybutadiene

Examples of the hydrocarbon-based solvent include aromatic hydrocarbons such as toluene, benzene, and xylene; aliphatic hydrocarbons such as n-hexane, butane, heptane, and pentane; alicyclic hydrocarbons such as cyclopentane and cyclohexane; olefin-based hydrocarbons such as the foregoing olefin compounds, cis-2-butene and trans-2-butene; hydrocarbon-based solvents such as mineral spirit, solvent naphtha, and kerosene; and halogenated hydrocarbon-based solvents such as methylene chloride. A 1,3-butadiene monomer per se may also be used as the polymerization solvent.

Of these, toluene, cyclohexane, or a mixture of cis-2-butene and trans-2-butene, or the like is suitably used.

Next, the water content in the mixed medium obtained by mixing 1,3-butadiene and the foregoing solvent is adjusted. The water content is preferably in the range of from 0.1 to 1.0 mole, and especially preferably from 0.2 to 1.0 mole per mole of the organoaluminum chloride in the foregoing medium. What the water content falls outside this range is not preferable because the catalytic activity is lowered; the content of the cis-1,4-structure is lowered; the molecular weight abnormally decreases or increases; the formation of a gel at the time of polymerization cannot be inhibited so that attachment of the gel to a polymerization tank or the like occurs; and in addition, the continuous polymerization time cannot be prolonged. As a method for adjusting the water content, known methods can be applied. A method for undergoing addition and dispersion by passing through a porous filtering material (see JP-A-4-85304) is also effective.

An organoaluminum compound is added to the solution obtained by adjusting the water content. Examples of the organoaluminum compound include trialkylaluminums, dialkylaluminum chlorides, dialkylaluminum bromides, alkylaluminum sesquichlorides, alkylaluminum sesquibromides, and alkylaluminum dichlorides.

Specific examples of the compound include trialkylaluminums such as trimethylaluminum, triethylaluminum, triisobutylaluminum, trihexylaluminum, trioctylaluminum, and tridecylaluminum.

In addition, dialkylaluminum chlorides such as dimethylaluminum chloride and diethylaluminum chloride; organoaluminum halides such as sesquiethylaluminum chloride and ethylaluminum dichloride; and hydrogenated organoaluminum compounds such as diethylaluminum hydride, diisobutylaluminum hydride, and sesquiethylaluminum hydride are also included. Two or more kinds of these organoaluminum compounds can be used jointly.

A specific example of the amount of the organoaluminum compound to be used is 0.1 mmoles or more, and especially preferably from 0.5 to 50 mmoles based on one mole of the whole amount of 1,3-butadiene.

Next, a soluble cobalt compound is added to the mixed medium having an organoaluminum compound added thereto, thereby undergoing cis-1,4-polymerization. The soluble cobalt compound is a cobalt compound which is soluble in an inert medium containing a hydrocarbon-based solvent as the major component or is soluble in liquid 1,3-butadiene, or is able to be uniformly dispersed. Examples thereof include β-diketone complexes of cobalt such as cobalt (II) acetylacetonate and cobalt(III) acetylacetonate; P-ketoacid ester complexes of cobalt such as a cobalt ethylacetoacetate complex; cobalt salts of an organic carboxylic acid having 6 or more carbon atoms such as cobalt octoate, cobalt naphthenate, and cobalt benzoate; and halogenated cobalt complexes such as a cobalt chloride pyridine complex and a cobalt chloride ethyl alcohol complex. The amount of the soluble cobalt compound to be used is 0.001 mmoles or more, and especially preferably 0.005 mmoles or more based on one mole of 1,3-butadiene. Furthermore, a molar ratio of the organoaluminum chloride to the soluble cobalt compound (Al/Co) is 10 or more, and especially preferably 50 or more. Moreover, in addition to the soluble cobalt compound, an organic carboxylic acid salt of nickel, an organic complex salt of nickel, an organolithium compound, an organic carboxylic acid salt of neodymium, and an organic complex salt of neodymium can be used.

With respect to the temperature at which the cis-1,4-polymerization is carried out, 1,3-budiene is subjected to cis-1,4-polymerization at a temperature in the range of from a temperature exceeding 0° C. to 100° C., preferably from 10 to 100° C., and more preferably from 20 to 100° C. The polymerization time (average residence time) is preferably in the range of from 10 minutes to 2 hours. It is preferred to carry out the cis-1,4-polymerization such that the polymer concentration after the cis-1,4-polymerization is from 5 to 26% by weight. As the polymerization tank, a single tank is used or two or more tanks are connected and used. The polymerization is carried out by stirring and mixing the solution within the polymerization tank (polymerizer). As the polymerization tank used for the polymerization, a polymerization tank equipped with a high-viscosity solution stirring unit, for example, a device as described in JP-B-40-2645 can be employed.

At the time of the cis-1,4-polymerization of the invention, a known molecular weight modifier, for example, non-conjugated dienes such as cyclooctadiene, allene, and methylallene (1,2-butadiene); and α-olefins such as ethylene, propylene, and butene-1 can be used. Furthermore, in order to further inhibit the formation of a gel at the time of the polymerization, a known gelation preventing agent can be used. In general, the content of the cis-1,4-structure is 90% or more, and especially preferably 95% or more.

The Mooney viscosity ($ML_{1+4}$ at 100° C., hereinafter abbreviated as "ML") is preferably from 10 to 130, and especially preferably from 15 to 80. A gel matter is not substantially contained.

The viscosity in a 5% toluene solution (Tcp) is preferably from 150 to 250. A gel matter is not substantially contained.

To the thus obtained cis-1,4-polymerization product, 1,3-butadiene may be added or may not be added. Then, by adding an organoaluminum compound represented by the general formula, $AlR_3$ and carbon disulfide and optionally, the foregoing soluble cobalt compound, the 1,3-butadine is subjected to 1,2-polymerization, thereby producing a vinyl-cis-polybutadiene rubber (VCR). Suitable examples of the organoaluminum compound represented by the general formula, $AlR_3$ include trimethylaluminum, triethylaluminum, triisobutylaluminum, tri-n-hexylaluminum, and triphenylaluminum. The amount of the organoaluminum compound is 0.1 mmoles or more, and especially from 0.5 to 50 mmoles per mole of the 1,3-butadiene. Though the carbon disulfide is not particularly limited, water-free carbon disulfide is preferable. The concentration of the carbon disulfide is not more than 20 mmoles/L, and especially preferably from 0.01 to 10 mmoles/L. As a replacement of the carbon disulfide, known phenyl isothiocyanate and xanthogenic acid compounds may be used.

The temperature at which the 1,2-polymerization is carried out is preferably from −5 to 100° C., and especially preferably from −5 to 50° C. In the 1,2-polymerization, by adding from 1 to 50 parts by weight, and preferably from 1 to 20 parts by weight, based on 100 parts by weight of the foregoing cis-polymerization solution, of 1,3-butadiene to the polymerization system, the yield of 1,2-polybutadiene at the time of the 1,2-polyerization can be increased. The polymerization time (average residence time) is preferably in the range of from 10 minutes to 2 hours. It is preferred to carry out the 1,2-polymerization such that the polymer concentration after the 1,2-polymerization is from 9 to 29% by weight. As the polymerization tank, a single tank is used or two or more tanks are connected and used. The polymerization is carried out by stirring and mixing the solution within the polymerization tank (polymerizer). With respect to the polymerization tank which is used for the 1,2-polymerization, since the viscosity becomes high during the 1,2-polymerization so that the polymer is liable to attach thereto, a polymerization tank equipped with a high-viscosity solution stirring unit, for example, a device as described in JP-B-40-2645 can be employed.

A proportion (HI) of a boiling n-hexane insoluble matter of the resulting vinyl-cis-polybutadiene is from 10 to 60% by weight, and especially preferably from 30 to 50% by weight.

After the polymerization reaction has reached a predetermined rate of polymerization, a known antioxidant can be added according to the usual way. Representative examples of the antioxidant include phenol-based antioxidants such as 2,6-di-t-butyl-p-cresol (BHT); phosphorus-based antioxidants such as trinonylphenyl phosphite (TNP); and sulfur-based antioxidants such as 4,6-bis(octylthiomethyl)-o-cresol and dilauryl-3,3'-thiodipropionate (TPL). The antioxidant may be used singly or in combination of two or more kinds thereof. The amount of addition of the antioxidant is from 0.001 to 5 parts by weight based on 100 parts by weight of VCR. Next, a short stop agent is added to the polymerization system, thereby stopping the polymerization. This is carried out by a method which is known by itself, for example, a method in which after completion of the polymerization reaction, the short stop agent is fed into a short stop tank and a large amount of a polar solvent such as alcohols such as methanol and ethanol and water is charged in this polymerization solution; and a method in which an inorganic acid such as hydrochloric acid and sulfuric acid, an organic acid such as acetic acid and benzoic acid, or a hydrogen chloride gas is introduced into the polymerization solution. Next, the formed vinyl-cis-polybutadiene (hereinafter abbreviated as "VCR") is separated, washed and dried according to the usual way.

A proportion (HI) of a boiling n-hexane insoluble matter of the thus obtained vinyl-cis-polybutadiene is preferably from 10 to 60% by weight, and especially preferably from 30 to 50% by weight.

A boiling n-hexane soluble matter is cis-1,4-polybutadiene in which the content of the microstructure is 90% or more.

The cis-polybutadiene containing 80% or more of a cis-1, 4-bond and having a Mooney viscosity ($ML_{1+4}$ at 100° C.) of from 20 to 80 can be used as a single kind or a blend of two or more kinds of cis-polybutadiene synthesized by using a cobalt catalyst or a nickel catalyst or a lanthanoid catalyst. Examples of the catalyst include a cobalt catalyst such as soluble cobalt compounds, an organic carboxylic acid salt of nickel, an organic complex salt of nickel, an organolithium compound, an organic carboxylic acid salt of neodymium, and an organic complex salt of neodymium. In the case of using this cis-polybutadiene, a hydrocarbon-based solvent to be used, adjustment conditions of the water content, 1,2-polymerization conditions, HI of the resulting vinyl-cis-polybutadiene and an antioxidant to be used are the same as those as described above. A boiling n-hexane soluble matter of the resulting vinyl-cis-polybutadiene is cis-1,4-polybutadiene in which the content of the microstructure is 80% or more. Furthermore, in the case of using this cis-polybutadiene, it is preferred to include a step of dissolving at least member of polyisoprene, liquid polyisoprene, crystalline polybutadiene having a melting point of not higher than 150° C., liquid polybutadiene, a styrene-isoprene-styrene compound, and derivatives thereof in a mixture containing 1,3-butadiene and a hydrocarbon-based solvent as the major components prior to the cis-1,4-polymerization or 1,2-polymerization. After the production of a vinyl-cis-polybutadiene rubber, for example, even when such a substance is added at the time of compounding, the effects of the invention of this application are not obtained. As the foregoing unsaturated high-molecular substance, at least one member selected from polyisoprene, crystalline polybutadiene having a melting point of lower than 170° C., linear polybutadiene, and derivatives thereof is preferable. Examples of the polyisoprene include usually synthetic polyisoprene (for example, cis-1,4-polyisoprene in which the content of the cis-structure is 90% or more), liquid polyisoprene, trans-polyisoprene, and other modified polyisoprene. The crystalline polybutadiene having a melting point of lower than 170° C. is preferably crystalline polybutadiene having a melting point of from 0 to 150° C., and examples thereof include low-melting point 1,2-polybutadiene and trans-polybutadiene. Examples of the liquid polybutadiene include extremely low-molecular polybutadiene having an inherent viscosity [η] of not more than 1. Furthermore, examples of these derivatives include an isoprene/isobutylene copolymer, an isoprene/styrene copolymer, a styrene/isoprene/styrene block copolymer, liquid epoxidized polybutadiene, liquid carboxyl-modified polybutadiene, and hydrogenation products of these derivatives. Of the foregoing respective unsaturated high-molecular substances, polyisoprene, a styrene/isoprene/styrene block copolymer, and 1,2-polybutadiene having a melting point of from 70 to 110° C. are preferably used. Further, the foregoing respective unsaturated high-molecular substances can be used singly in admixture of two or more kinds thereof. As described previously, when the foregoing unsaturated high-molecular substance is added, in the resulting vinyl-cis-polybutadiene rubber, the dispersibility of 1,2-polybutadiene having a melting point of 170° C. or higher into the cis-polybutadiene rubber as a matrix component is remarkably enhanced due to a compatible effect of the unsaturated high-molecular substance. As a result, the characteristics of the resulting vinyl-cis-polybutadiene rubber become excellent. The amount of addition of the unsaturated high-molecular substance is preferably in the range of from 0.01 to 50% by mass, and more preferably from 0.01 to 30% by mass based on the vinyl-cis-polybutadiene rubber to be obtained. Furthermore, with respect to the addition at any point of time, after the addition, stirring is preferably carried out for from 10 minutes to 3 hours, and more preferably from 10 minutes to 30 minutes.

From the mixture containing unreacted 1,3-butadiene as remained after separating and obtaining the thus obtained VCR, the inert medium and carbon disulfide, 1,3-butadiene and the inert medium are separated by distillation. On the other hand, the carbon disulfide is separated and removed by an adsorption and separation treatment of carbon disulfide or a separation treatment of a carbon disulfide adduct, thereby recovering 1,3-butadiene and the inert medium which do not substantially contain carbon disulfide. Furthermore, 1,3-butadiene and the inert medium which do not substantially contain carbon disulfide can also be recovered by recovering the three components from the foregoing mixture by distillation and then separating and removing the carbon disulfide by the foregoing adsorption and separation or separation treatment of a carbon disulfide adduct. The thus recovered carbon disulfide and inert medium are mixed with 1,3-butaduene as newly replenished and then provided for use.

When continuous operation is carried out by the process according to the invention, it is possible to continuously produce VCR industrially advantageously with excellent operability of the catalyst component and in a high catalytic efficiency. In particular, it is possible to continuously produce VCR industrially advantageously in a high conversion without causing attachment to an inner wall in the polymerization tank, a stirring blade and other portions where stirring is slow.

(B) Production of cis-polybutadiene

Cis-polybutadiene can be produced in the same manner as in the foregoing production process (A) which is used in the invention, namely the step of adding the cis-1,4-polymerization catalyst, thereby subjecting the 1,3-butadiene to cis-1,4-polymerization.

In general, the resulting cis-polybutadiene preferably has a content of the cis-1,4-structure of 90% or more, and especially preferably 95% or more.

The Mooney viscosity ($ML_{1+4}$ at 100° C., hereinafter abbreviated as "ML") is from 10 to 130, and especially preferably from 15 to 80. A gel matter is not substantially contained.

The viscosity in a 5% toluene solution (Tcp) is preferably from 30 to 250.

Furthermore, in the invention, the cis-polybutadiene solution obtained in the step of dissolving the cis-polybutadiene containing 80% or more of a cis-1,4-bond and having a Mooney viscosity ($ML_{1+4}$ at 100° C.) of from 20 to 80 in a mixture containing 1,3-butadiene and/or a hydrocarbon-based organic solvent as the major component may be used as the component (B). It is preferable that the subject cis-polybutadiene (B) is produced as a single kind or a blend of two or more kinds of cis-polybutadiene synthesized by using a cobalt catalyst or a nickel catalyst or a lanthanoid catalyst. The concentration of the foregoing cis-polybutadiene in the mixture containing 1,3-butadiene and a hydrocarbon-based organic solvent as the major components and having an adjusted water content is preferably from 1 to 30% by weight.

A proportion of the vinyl-cis-polybutadiene (A) to the cis-polybutadiene (B) in the vinyl-cis-polybutadiene rubber obtained by solution mixing (A) and (B) is preferably from 10/90 to 50/50 by weight in terms of (A)/(B).

The vinyl-cis-polybutadiene rubber obtained according to the invention (hereafter sometimes referred to as "vinyl-cis-polybutadiene rubber (a)") is useful for tires and can be used for rubber applications which are required to have rigidity, mechanical characteristic and failure characteristic, such as sidewalls, treads, stiffers, bead fillers, inner liners, carcasses, and other various industrial products such as hoses and belts. It can also be used as a plastic modifier.

A composition resulting from adding and kneading the foregoing compounding agents in the vinyl-cis-polybutadiene rubber obtained according to the invention has a lowered die swell ratio (a ratio of the cross-sectional area of the compounded material at the time of extrusion to the cross-sectional area of a die orifice) of 95 or less as converted into an index (when the value is lowered, the properties become excellent) and has excellent extrusion processability as compared with those obtained by the conventional methods.

Furthermore, when the vinyl-cis-polybutadiene rubber composition (compounded material) obtained according to the invention is vulcanized, the tensile stress is enhanced. In particular, the 100% tensile stress is remarkably enhanced and is increased by about 20 (for example, from 10 to 20) as converted into an index (when the value increases, the properties become excellent) as compared with the foregoing vinyl-cis-polybutadiene rubbers obtained by the conventional methods, and a reinforcing effect is largely improved. Furthermore, because of high rigidity, a lowering of the amount of use of a reinforcing material such as carbon and silica becomes easy, and it becomes possible to realize low fuel consumption by lightening of tire.

In addition, when the vinyl-cis-polybutadiene rubber composition (compounded material) obtained according to the invention is vulcanized, the vulcanizate reveals high rebound resilience and low exothermic characteristics as compared with the conventional vinyl-cis-polybutadiene rubbers. The rebound resilience is increased by about 5 as converted into an index (for example, from 2 to 5) (when the value increases, the properties become excellent), and the exothermic characteristics are lowered by about 10 as converted into an index (when the value is small, the characteristics become excellent). Thus, an energy loss is small, and it becomes possible to realize low fuel consumption of tire. Accordingly, a tire using the vinyl-cis-polybutadiene rubber of the invention as a raw material of sidewall or tread exhibits excellent running stability, durability and high-speed durability due to the foregoing characteristics and makes it possible to realize low fuel consumption. Furthermore, similarly, with respect to heat resistant physical properties as required in a run flat tire, etc., gas permeability of oxygen, etc. is lowered by about 5 as converted into an index (when the value is lowered, the properties become excellent) and an effect for inhibiting the heat generation following the deterioration by oxidation is revealed as compared with the vinyl-cis-polybutadiene rubbers obtained by the conventional methods.

By compounding from 10 to 100 parts by weight of a rubber reinforcing agent in 100 parts by weight of a rubber of the vinyl-cis-polybutadiene rubber obtained according to the invention and a rubber selected from the group consisting of a natural rubber, a synthetic rubber and a blend rubber thereof in an arbitrary proportion, a rubber composition can be produced.

Next, a rubber composition for sidewall which is used in the invention is formed by compounding (a) the foregoing vinyl-cis-polybutadiene rubber, (b) a diene-based rubber other than (a), and (c) a rubber reinforcing agent.

A silica compounded rubber composition which is used in the invention is formed by compounding (a) the foregoing vinyl-cis-polybutadiene rubber, (b) a diene-based rubber other than (a), and (c) a rubber reinforcing agent containing 40% or more of silica.

A rubber composition for cap tread of passenger automobile tire which is used in the invention is formed by compounding (a) the foregoing vinyl-cis-polybutadiene rubber, (d) a styrene-butadiene rubber, (b) a diene-based rubber other than (a) and (d), and (c) a rubber reinforcing agent.

A rubber composition for tire cord coating which is used in the invention is formed by compounding (a) the foregoing vinyl-cis-polybutadiene rubber, (b) a diene-based rubber other than (a), and (c) a rubber reinforcing agent.

A rubber composition for base tread which is used in the invention is formed by compounding (a) the foregoing vinyl-cis-polybutadiene rubber, (b) a diene-based rubber other than (a), and (c) a rubber reinforcing agent.

A high-hardness compounded rubber composition which is used in the invention is formed by compounding (a) the foregoing vinyl-cis-polybutadiene rubber, (b) a diene-based rubber other than (a), and (c) a rubber reinforcing agent.

A rubber composition for large-sized vehicle tire which is used in the invention is formed by compounding (a) the foregoing vinyl-cis-polybutadiene rubber, (b) a diene-based rubber other than (a), and (c) a rubber reinforcing agent.

Examples of the foregoing diene-based rubber (b) include a high cis-polybutadiene rubber, a low cis-polybutadiene rubber (BR), a natural rubber, a polyisoprene rubber, an emulsion polymerized or solution polymerized styrene-butadiene rubber (SBR), an ethylene-propylene-diene rubber (EPDM), a nitrile rubber (NBR), a butyl rubber (IIR), and a chloroprene rubber (CR).

Furthermore, derivatives of these rubbers, for example, polybutadiene rubbers modified with a tin compound and the foregoing rubbers which are subjected to epoxy modification, silane modification or maleic acid modification can also be used. These rubbers may be used singly or in combination with two or more kinds thereof.

Examples of the rubber reinforcing agent which is the component (c) of the invention include, in addition to various carbon blacks, inorganic reinforcing agents such as white carbon, activated calcium carbonate, and ultra-finely divided magnesium silicate; and organic reinforcing agents such as a syndiotactic 1,2-polybutadiene resin, a polyethylene resin, a polypropylene resin, a hi-styrene resin, a phenol resin, lignin, a modified melamine resin, a coumarone-indene resin, and a petroleum resin. Of these, carbon black having a particle size of not more than 90 nm and having an oil absorption of dibutyl phthalate (DBP) of 70 mL/100 g or more is especially preferable, and examples thereof include FEF, FF, GPF, SAF, ISAF, SRF, and HAF. Furthermore, examples of the silica include silicic acid anhydride by the dry method and hydrated silicic acid and synthetic silicates by the wet method.

In the rubber composition for sidewall of the invention, the foregoing respective components are compounded so as to satisfy the condition of 100 parts by weight of a rubber component of from 20 to 80% by weight of the vinyl-cis-polybutadiene (a) and from 80 to 20% by weight of the diene-based rubber (b) other than (a) and from 25 to 60 parts by weight of the rubber reinforcing agent (c).

When the amount of the foregoing vinyl-cis-polybutadiene is less than the foregoing lower limit, the die swell is large, and a rubber composition having low fuel consumption with respect to a vulcanizate thereof is not obtained, whereas when the amount of the foregoing vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the die swell becomes large, whereas when it exceeds the foregoing upper limit, the Mooney viscosity is excessively high so that kneading becomes difficult, and therefore, such is not preferable.

In the silica compounded rubber composition for tire of the invention, the foregoing respective components are compounded so as to satisfy the condition of 100 parts by weight of a rubber component of from 20 to 80% by weight of the vinyl-cis-polybutadiene (a) and from 80 to 20% by weight of the diene-based rubber (b) other than (a) and from 40 to 100 parts by weight of the rubber reinforcing agent containing 40% or more of silica (c).

When the amount of the foregoing vinyl-cis-polybutadiene is less than the foregoing lower limit, the die swell is large, and a rubber composition having low exothermic characteristics with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the elastic modulus of a vulcanizate thereof is lowered, whereas when it exceeds the foregoing upper limit, the Mooney viscosity is excessively high so that the moldability of tire is liable to become worse. Furthermore, when the proportion of the rubber falls outside the foregoing range, the abrasion resistance of a vulcanizate thereof and the like are lowered.

In the rubber composition for passenger automobile tire of the invention, the foregoing respective components are compounded so as to satisfy the condition of 100 parts by weight of a rubber component of from 10 to 50% by weight of the vinyl-cis-polybutadiene (a), from 30 to 70% by weight of the styrene-butadiene rubber (d) and from 0 to 60% by weight of the diene-based rubber (b) other than (a) and (d) and from 40 to 100 parts by weight of the rubber reinforcing agent (c).

When the amount of the foregoing vinyl-cis-polybutadiene is less than the foregoing lower limit, a rubber composition having a high elastic modulus with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the elastic modulus of a vulcanizate thereof is lowered, whereas when it exceeds the foregoing upper limit, the Mooney viscosity is excessively high so that the moldability of tire is liable to become worse. Furthermore, when the proportion of the rubber falls outside the foregoing range, the abrasion resistance of a vulcanizate thereof and the like are lowered.

In the rubber composition for tire cord coating of the invention, the foregoing respective components are compounded so as to satisfy the condition of 100 parts by weight of a rubber component of from 10 to 60% by weight of the vinyl-cis-polybutadiene (a) and from 90 to 40% by weight of the diene-based rubber (b) other than (a) and from 30 to 80 parts by weight of the rubber reinforcing agent (c).

When the amount of the foregoing vinyl-cis-polybutadiene is less than the foregoing lower limit, a rubber composition having a high elastic modulus with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the elastic modulus of a vulcanizate thereof is lowered, whereas when it exceeds the foregoing upper limit, the Mooney viscosity is excessively high so that the moldability of tire is liable to become worse. Furthermore, when the proportion of the rubber falls outside the foregoing range, the elastic modulus of a vulcanizate thereof and the like are lowered, and adhesiveness to metals is lowered.

In the rubber composition for base tread of the invention, the foregoing respective components are compounded so as to satisfy the condition of 100 parts by weight of a rubber component of from 20 to 80% by weight of the vinyl-cis-polybutadiene (a) and from 80 to 20% by weight of the diene-based rubber (b) other than (a) and from 25 to 55 parts by weight of the rubber reinforcing agent (c).

When the amount of the foregoing vinyl-cis-polybutadiene is less than the foregoing lower limit, the die swell is large, and a rubber composition having low exothermic characteristics with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the die swell becomes large, whereas when it exceeds the foregoing upper limit, the Mooney viscosity is excessively high so that kneading becomes difficult, and therefore, such is not preferable.

In the high-hardness compounded rubber composition of the invention, the foregoing respective components are compounded so as to satisfy the condition of 100 parts by weight of a rubber component of from 20 to 80% by weight of the vinyl-cis-polybutadiene (a) and from 80 to 20% by weight of the diene-based rubber (b) other than (a) and from 40 to 100 parts by weight of the rubber reinforcing agent (c).

When the amount of the foregoing vinyl-cis-polybutadiene is less than the foregoing lower limit, the die swell is large, and a rubber composition having low exothermic characteristics with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the die swell becomes large, whereas when it exceeds the foregoing upper limit, the Mooney viscosity is excessively high so that kneading becomes difficult, and therefore, such is not preferable.

In the rubber composition for large-sized vehicle tire of the invention, the foregoing respective components are compounded so as to satisfy the condition of 100 parts by weight of a rubber component of from 10 to 60% by weight of the vinyl-cis-polybutadiene (a) and from 90 to 40% by weight of the diene-based rubber (b) other than (a) and from 45 to 70 parts by weight of the rubber reinforcing agent (c).

When the amount of the foregoing vinyl-cis-polybutadiene is less than the foregoing lower limit, a rubber composition having a high elastic modulus with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the elastic modulus of a vulcanizate thereof is lowered, whereas when it exceeds the foregoing upper limit, the Mooney viscosity is excessively high so that the moldability of tire is liable to become worse. Furthermore, when the proportion of the rubber falls outside the foregoing range, the elastic modulus of a vulcanizate thereof and the like are lowered.

The rubber composition of the invention is obtained by kneading the foregoing respective components in the usual way by using a Banbury, an open roll, a kneader, a twin-screw kneading machine, etc. The kneading temperature is required to be lower than the melting point of the 1,2-polybutadiene crystal fiber which is contained in the subject vinyl-cis-polybutadiene. When kneading is carried out at a temperature of higher than this melting point of the 1,2-polybutadiene crystal fiber, fine short fibers in the vinyl-cis-polybutadiene are melted and deformed into a spherical particle or the like, and therefore, such is not preferable.

In the rubber composition of the invention, if desired, compounding agents which are usually used in the rubber field, such as a vulcanizer, a vulcanization aid, an antioxidant, a filler, a process oil, zinc white, and stearic acid, may be kneaded.

As the vulcanizer, known vulcanizers such as sulfur, organic peroxides, resin vulcanizers, and metal oxides such as magnesium oxide are useful.

As the vulcanization aid, known vulcanization aids such as aldehydes, ammonias, amines, guanidines, thioureas, thiazoles, thiurams, dithiocarbamates, and xanthates are useful.

Examples of the antioxidant include amine/ketone-based antioxidants, imidazole-based antioxidants, amine-based antioxidants, phenol-based antioxidants, sulfur-based antioxidants, and phosphorus-based antioxidants.

Examples of the filler include inorganic fillers such as calcium carbonate, basic magnetic carbonate, clay, litharge, and diatomaceous earth; and organic fillers such regenerated rubbers and powdered rubbers.

As the process oil, all of aromatic process oils, naphthene-based process oils, and paraffin-based process oils are useful.

The rubber composition for sidewall of the invention has a small die swell and has a low exothermic characteristic with respect to a vulcanizate thereof. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for sidewall.

The silica compounded rubber composition for tire of the invention can be designed to enhance the die swell performance, the abrasion resistant performance and the low fuel consumption performance while keeping the wet skid properties and is suitable for applications such as a tread or sidewall of a tire with a more highly balance of the performances.

The rubber composition of passenger automobile tire of the invention has excellent extrusion molding processability and has satisfactory characteristics in high-speed running properties, grip properties on a wet road surface and abrasion resistance. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for cap tread.

The rubber composition for tire cord coating of the invention has a small die swell and a large green strength and has excellent extrusion molding processability and moldability while keeping a high elastic modulus. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for tire cord coating.

The rubber composition for base tread of the invention has a small die swell and has a low exothermic characteristic with respect to a vulcanizate thereof. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for base tread.

The high-hardness compounded rubber composition of the invention has a small die swell and has a low exothermic characteristic with respect to a vulcanizate thereof. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known high-hardness compounded rubber compositions.

The rubber composition for large-sized vehicle tire of the invention has a small die swell and has excellent extrusion processability while keeping a high elastic modulus. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for cap tread.

EXAMPLES

Examples based on the invention will be specifically described below. In the Examples and Comparative Examples, physical properties of a raw rubber of the resulting vinyl-cis-polybutadiene rubber, physical properties of a compounded material of the resulting rubber composition, and physical properties of a vulcanizate thereof were measured in the following manners.

(1) Boiling N-Hexane Insoluble Matter (H.I.):

An extraction residue resulting from subjecting 2 g of a vinyl-cis-polybutadiene rubber to boiling extraction with 200 mL of n-hexane for 4 hours by a Soxhlet extractor was expressed in terms of parts by weight.

(2) Mooney Viscosity:

This is a value obtained by measuring a vinyl-cis-polybutadiene rubber and a compounded material of a vinyl-cis-polybutadiene rubber at 100° C. according to JIS K6300.

(3) Viscosity in Toluene Solution of Cis-Polybutadiene Rubber:

A viscosity in a 5% by weight toluene solution of cis-polybutadiene at 25° C. was measured and expressed in terms of centipoises (cp).

(4) Die Swell:

As an estimation for extrusion processability of a compounded material, a ratio of the cross-sectional area of the compounded material to the cross-sectional area of a die orifice (wherein L/D=1.5 mm/1.5 mm) was measured at the time of extrusion at 100° C. and at a shear rate of 100 $\sec^{-1}$ by using a processability analyzer (MPT, manufactured by Monsanto) and determined. Also, an index was calculated while taking the Comparative Example as "100". It is meant that the smaller the numerical value, the more satisfactory the extrusion processability.

(5) Tensile Elastic Modulus:

A tensile elastic modulus M100 was measured according to JIS K6251. Also, an index was calculated while taking the Comparative Example as "100". It is meant that the larger the numerical value, the higher the tensile stress.

(5') Tensile Elastic Modulus:

A tensile elastic modulus M300 was measured according to JIS K6251. Also, an index was calculated while taking the Comparative Example as "100". It is meant that the larger the numerical value, the higher the tensile stress.

(6) Rebound Resilience:

This was measured according to a measurement method as defined in JIS K6255. Also, an index was calculated while taking the Comparative Example as "100". It is meant that the larger the numerical value, the more satisfactory the rebound resilience.

(7) Heat Build-Up and Permanent Set:

They were measured according to a measurement method as defined in JIS K6265. Also, an index was calculated while taking the Comparative Example as "100". It is meant that the smaller the numerical value, the more satisfactory the physical properties of all of the heat build-up and the permanent set.

(8) Low Fuel Consumption (Low Exothermic Characteristics):

This was measured according to a measurement method as defined in JIS K6265. Also, an index was calculated while taking the Comparative Example as "100". It is meant that the smaller the numerical value, the more satisfactory the physical properties.

(9) Pico Abrasion:

A Pico abrasion index was measured according to ASTM D2228, and an index was calculated while taking the Comparative Example as "100". It is meant that the larger the numerical value, the higher the Pico abrasion performance, thereby exhibiting satisfactory physical properties.

(10) Wet skid properties:

This was measured by using a potable wet skid tester and 3M's Safety-Walk (Type B). Also, an index was calculated while taking the Comparative Example as "100". It is meant that the larger the numerical value, the higher the wet skid performance, thereby exhibiting satisfactory physical properties.

(11) Green Modulus:

An unvulcanized rubber was punched out by a No. 3 dumbbell to prepare a specimen, which was then measured at room temperature at a drawing rate of 200 mm/min. Also, an index was calculated while taking the Comparative Example as "100". It is meant that the larger the numerical value, the higher and more satisfactory the green modulus.

(12) Adhesive Strength to Metal:

This was measured according to ASTM D2229. Also, an index was calculated while taking the Comparative Example as "100". It is meant that the larger the numerical value, the higher and more satisfactory the adhesive strength to metal.

(13) Hardness:

This was measured at room temperature by using a type A durometer according to JIS K6253. An index was calculated while taking the Comparative Example as "100". It is meant that the larger the numerical value, the higher the hardness, thereby exhibiting satisfactory physical properties.

Example 1-1

(A) Production of vinyl-cis-polybutadiene

In a stirrer-equipped stainless steel-made reaction tank having an internal volume of 1.5 L and purged with a nitrogen gas, 1.0 L of a polymerization solution (butadiene: 31.5% by weight, 2-butenes: 28.8% by weight, cyclohexane: 39.7% by weight) was charged, to which were then added 1.7 mmoles of water, 2.9 mmoles of diethylaluminum chloride, 0.3 mmoles of carbon disulfide, 13.0 mmoles of cyclooctadiene and 0.005 mmoles of cobalt octoate, and the mixture was stirred at 40° C. for 20 minutes, thereby undergoing 1,4-cis-polymerization. At this time, a small amount of the cis-polybutadiene polymerization solution was taken out from the reaction tank and dried, and the viscosity in a toluene solution of the resulting cis-polybutadiene rubber was measured and found to be 175. Thereafter, 150 mL of butadiene, 1.1 mmoles of water, 3.5 mmoles of triethyl aluminum and 0.04 mmoles of cobalt octoate were added, and the mixture was stirred at 40° C. for 20 minutes, thereby undergoing to 1,2-syndiotactic polymerization. An antioxidant ethanol solution was added thereto. Thereafter, the unreacted butadiene and 2-butenes were removed by evaporation, thereby obtaining vinyl-cis-polybutadiene having an HI of 40.5% in a yield of 66 g. 58 g of this vinyl-cis-polybutadiene was dissolved in cyclohexane to prepare vinyl-cis-polybutadiene slurry.

(B) Production of cis-polybutadiene

In a stirrer-equipped stainless steel-made reaction tank having an internal volume of 1.5 L and purged with a nitrogen gas, 1.0 L of a polymerization solution (butadiene: 31.5% by weight, 2-butenes: 28.8% by weight, cyclohexane: 39.7% by weight) was charged, to which were then added 1.7 mmoles of water, 2.9 mmoles of diethylaluminum chloride, 20.0 mmoles of cyclooctadiene and 0.005 mmoles of cobalt octoate, and the mixture was stirred at 60° C. for 20 minutes, thereby undergoing 1,4-cis-polymerization. An antioxidant ethanol solution was added thereto, thereby stopping the polymerization. Thereafter, the unreacted butadiene and 2-butenes were removed by evaporation, thereby obtaining 81 g of cis-polybutadiene having a Mooney viscosity of 29.0 and a viscosity in a toluene solution of 48.3. This operation was repeated twice, and 162 g in total of cis-polybutadiene was dissolved in cyclohexane, thereby preparing a cyclohexane solution of cis-polybutadiene.

Production of vinyl-cis-polybutadiene rubber of mixture of (A) and (B)

The foregoing cyclohexane solution of cis-polybutadiene having 162 g of cis-polybutadiene dissolved therein was charged in a stirrer-equipped stainless steel-made reaction tank having an internal volume of 5.0 L and purged with a nitrogen gas, to which was then added the foregoing vinyl-cis-polybutadiene cyclohexane slurry containing 58 g of vinyl-cis-polybutadiene while stirring. After adding the slurry, the stirring was continued for one hour, followed by drying in vacuo at 105° C. for 60 minutes, thereby obtaining 220 g of a vinyl-cis-polybutadiene rubber of a mixture of (A) and (B). This polymer mixture had an ML of 61.1 and an HI of 11.9%.

Comparative Example 1-1

In a stirrer-equipped stainless steel-made reaction tank having an internal volume of 5 L and purged with a nitrogen gas, 3.5 L of a polymerization solution (butadiene: 31.5% by weight, 2-butenes: 28.8% by weight, cyclohexane: 39.7% by weight) was charged, to which were then added 5.3 mmoles of water, 10.5 mmoles of diethylaluminum chloride, 1.8 mmoles of carbon disulfide, 40.0 mmoles of cyclooctadiene and 0.004 mmoles of cobalt octoate, and the mixture was stirred at 40° C. for 20 minutes, thereby undergoing 1,4-cis-polymerization. Thereafter, 560 mL of butadiene, 4.5 mmoles of water, 13.4 mmoles of triethyl aluminum and 0.04 mmoles of cobalt octoate were added, and the mixture was stirred at 40° C. for 20 minutes, thereby undergoing 1,2-syndiotatic polymerization. An antioxidant ethanol solution was added thereto, thereby stopping the polymerization. Thereafter, the unreacted butadiene and 2-butenes were removed by evaporation, followed by drying in vacuo at 105° C. for 60 minutes, thereby obtaining 350 g of a 1,4-cis-1,2-vinyl polymer. This VCR had an ML of 58.0 and an HI of 11.8%.

Each of the vinyl-cis-polybutadiene rubbers of the foregoing Example and Comparative Example was subjected to primary compounding by adding thereto and kneading therewith carbon black, a process oil, zinc white, stearic acid and an antioxidant by using a plastomill and subsequently subjected to secondary compounding by the addition of a vulcanization accelerator and sulfur by using a roll according to a compounding table of Table 1, thereby preparing a compounded rubber. By using this compounded rubber, its die swell was measured. In addition, this compounded rubber was molded depending upon the desired physical properties and press vulcanized at 150° C. to obtain a vulcanizate, the physical properties of which were then measured. The measurement results of the respective physical properties are shown in Table 2 while taking the Comparative Example as "100".

TABLE 1

|  | Compounding amount (parts by weight) |
|---|---|
| Vinyl-cis-polybutadiene | 100 |
| HAF carbon black | 50 |
| Process oil | 10 |
| Zinc white No. 1 | 5 |
| Stearic acid | 2 |
| Antioxidant (Note 1) | 1 |
| Vulcanization accelerator (Note 2) | 1 |
| Sulfur | 1.5 |

(Note 1) ANTAGE AS (a compound between amine and ketone)
(Note 2) NOCCELER CZ (N-cyclohexyl-2-benzothiazole sulfenamide)

TABLE 2

|  | Example 1-1 | Comparative Example 1-1 |
|---|---|---|
| Component (A): |  |  |
| Viscosity in toluene solution of cis-polybutadiene | 175 | — |
| H.I. (%) | 40.5 | — |
| Component (B): |  |  |
| Mooney viscosity | 29 | — |
| Viscosity in toluene solution | 48.3 | — |
| Whole polymer: |  |  |
| Viscosity in toluene solution of cis-polybutadiene | — | 49.9 |
| Mooney viscosity | 61.1 | 58.8 |
| H.I. (%) | 11.9 | 11.8 |
| Physical properties of compounded material: |  |  |
| Die swell | 91 | 100 |
| Physical properties of vulcanizate: |  |  |
| Tensile elastic modulus M100 | 119 | 100 |
| Rebound resilience | 106 | 100 |
| Flexometer test |  |  |
| Heat build-up ΔT | 88 | 100 |
| Permanent set | 85 | 100 |

Example 2-1

(A) Production of vinyl-cis-polybutadiene

In a stirrer-equipped stainless steel-made reaction tank having an internal volume of 1.5 L and purged with a nitrogen gas, 1.0 L of a polymerization solution (butadiene: 31.5% by weight, 2-butenes: 28.8% by weight, cyclohexane: 39.7% by weight) was charged, to which were then added 1.7 mmoles of water, 2.9 mmoles of diethylaluminum chloride, 0.3 mmoles of carbon disulfide, 13.0 mmoles of cyclooctadiene and 0.005 mmoles of cobalt octoate, and the mixture was stirred at 40° C. for 20 minutes, thereby undergoing 1,4-cis-polymerization. Thereafter, 150 mL of butadiene, 1.1 mmoles of water, 3.5 mmoles of triethyl aluminum and 0.04 mmoles of cobalt octoate were added, and the mixture was stirred at 40° C. for 20 minutes, thereby undergoing to 1,2-syndiotactic polymerization. An antioxidant ethanol solution was added thereto. Thereafter, the unreacted butadiene and 2-butenes were removed by evaporation, thereby obtaining vinyl-cis-polybutadiene having an HI of 40.5% in a yield of 66 g. 58 g of this vinyl-cis-polybutadiene was dissolved in cyclohexane to prepare vinyl-cis-polybutadiene slurry.

(B) Production of cis-polybutadiene solution

In a stirrer-equipped stainless steel-made reaction tank having an internal volume of 3.0 L and purged with a nitrogen gas, 2.0 L of cyclohexane was charged and dissolved in 136 g of cis-cis-polybutadiene (a trade name: UBEPOL-BR130B) manufactured by Ube Industries, Ltd. and having an ML viscosity of 29, thereby preparing a cyclohexane solution of cis-polybutadiene.

Production of vinyl-cis-polybutadiene rubber of mixture of (A) and (B)

The foregoing cyclohexane solution of cis-polybutadiene having 136 g of cis-polybutadiene dissolved therein was charged in a stirrer-equipped stainless steel-made reaction tank having an internal volume of 5.0 L and purged with a nitrogen gas, to which was then added the foregoing vinyl-cis-polybutadiene cyclohexane slurry containing 58 g of vinyl-cis-polybutadiene while stirring. After adding the slurry, the stirring was continued for one hour, followed by drying in vacuo at 105° C. for 60 minutes, thereby obtaining 194 g of a vinyl-cis-polybutadiene rubber of a mixture of (A) and (B). This polymer mixture had an ML of 60 and an HI of 12.1%.

Example 2-2

Vinyl-cis-polybutadiene was obtained in the same manner as in Example 2-1, except for using BR150L (manufactured by Ube Industries, Ltd.) as the cis-polybutadiene in (B). This polymer mixture had an ML of 68 and an HI of 11.9%.

Example 2-3

Vinyl-cis-polybutadiene was obtained in the same manner as in Example 2-1, except for using BR01 (manufactured by JSR Corporation) as the cis-polybutadiene in (B). This polymer mixture had an ML of 69 and an HI of 12.0%.

Example 2-4

Vinyl-cis-polybutadiene was obtained in the same manner as in Example 2-1, except for dissolving 10 g of polyisoprene (IR2200, manufactured by JSR Corporation) having been reprecipitated and purified in 1.0 L of the polymerization solution before the 1,4-cis-polymerization in the production of vinyl-cis-polybutadiene in (A).

This polymer mixture had an ML of 62 and an HI of 12.1%.

Comparative Example 2-1

In a stirrer-equipped stainless steel-made reaction tank having an internal volume of 5 L and purged with a nitrogen gas, 3.5 L of a polymerization solution (butadiene: 31.5% by weight, 2-butenes: 28.8% by weight, cyclohexane: 39.7% by weight) was charged, to which were then added 5.3 mmoles of water, 10.5 mmoles of diethylaluminum chloride, 1.8 mmoles of carbon disulfide, 40.0 mmoles of cyclooctadiene and 0.004 mmoles of cobalt octoate, and the mixture was stirred at 40° C. for 20 minutes, thereby undergoing 1,4-cis-polymerization. Thereafter, 560 mL of butadiene, 4.5 mmoles of water, 13.4 mmoles of triethyl aluminum and 0.04 mmoles of cobalt octoate were added, and the mixture was stirred at 60° C. for 20 minutes, thereby undergoing 1,2-syndiotatic polymerization. An antioxidant ethanol solution was added thereto, thereby stopping the polymerization. Thereafter, the unreacted butadiene and 2-butenes were removed by evaporation, followed by drying in vacuo at 105° C. for 60 minutes, thereby obtaining 350 g of a 1,4-cis-1,2-vinyl polymer. This VCR had an ML of 58 and an HI of 11.8%.

Each of the vinyl-cis-polybutadiene rubbers of the foregoing Examples and Comparative Example was subjected to primary compounding by adding thereto and kneading therewith carbon black, a process oil, zinc white, stearic acid and an antioxidant by using a plastomill and subsequently subjected to secondary compounding by the addition of a vulcanization accelerator and sulfur by using a roll according to a compounding table of Table 3, thereby preparing a compounded rubber. By using this compounded rubber, its die swell was measured. In addition, this compounded rubber was molded depending upon the desired physical properties and press vulcanized at 150° C. to obtain a vulcanizate, the physical properties of which were then measured. The measurement results of the respective physical properties are shown in Table 4 while taking the Comparative Example as "100".

TABLE 3

| | Compounding amount (parts by weight) |
|---|---|
| Vinyl-cis-polybutadiene | 100 |
| HAF carbon black | 50 |
| Process oil | 10 |
| Zinc white No. 1 | 5 |
| Stearic acid | 2 |
| Antioxidant (Note 1) | 1 |
| Vulcanization accelerator (Note 2) | 1 |
| Sulfur | 1.5 |

(Note 1) ANTAGE AS (a compound between amine and ketone)
(Note 2) NOCCELER CZ (N-cyclohexyl-2-benzothiazole sulfenamide)

TABLE 4

| | Example | | | | Comparative Example |
|---|---|---|---|---|---|
| | 2-1 | 2-2 | 2-3 | 2-4 | 2-1 |
| Component (A): | | | | | |
| Mooney viscosity of cis-polybutadiene | 34 | 34 | 34 | — | — |
| Viscosity in toluene solution of cis-polybutadiene | 88 | 88 | 88 | — | — |
| Mooney viscosity of polyisoprene (IR) | — | — | — | 90 | — |
| H.I. (%) | 40.5 | 40.5 | 40.5 | 36.2 | — |
| Component (B): | | | | | |
| Mooney viscosity | 29 | 43 | 44 | 29 | — |
| Viscosity in toluene solution | 30 | 105 | 150 | 30 | — |
| Whole polymer (A + B): | | | | | |
| Mooney viscosity | 60 | 68 | 69 | 62 | 58 |
| IR (%) | — | — | — | 5.0 | — |
| H.I. (%) | 12.1 | 11.9 | 12.0 | 12.1 | 11.8 |
| Physical properties of compounded material: | | | | | |
| Die swell | 95 | 92 | 94 | 93 | 100 |
| Physical properties of vulcanizate: | | | | | |
| Tensile elastic modulus M100 | 112 | 122 | 118 | 115 | 100 |
| Rebound resilience | 101 | 103 | 102 | 102 | 100 |
| Flexometer test: | | | | | |
| Heat build-up ΔT | 99 | 96 | 98 | 97 | 100 |
| Permanent set | 97 | 94 | 97 | 96 | 100 |

Example 3-1

(A) Production of vinyl-cis-polybutadiene

In a stirrer-equipped stainless steel-made reaction tank having an internal volume of 1.5 L, 40 g of a cis-polybutadiene rubber (a trade name: UBEPOL-BR130B) manufactured by Ube Industries, Ltd. and having been reprecipitated purified was charged, and after purging with a nitrogen gas, 350 mL of cyclohexane was added for dissolution. To this solution, 150 mL of butadiene, 1.1 mmoles of water, 3.5 mmoles of triethyl aluminum and 0.04 mmoles of cobalt octoate were added, and the mixture was stirred at 40° C. for 20 minutes, thereby undergoing to 1,2-syndiotactic polymerization. An antioxidant ethanol solution was added thereto. Thereafter, the unreacted butadiene was removed by evaporation, thereby obtaining vinyl-cis-polybutadiene having an HI of 36.2% in a yield of 63 g. 58 g of this vinyl-cis-polybutadiene was dissolved in cyclohexane to prepare vinyl-cis-polybutadiene slurry.

(B) Production of cis-polybutadiene

In a stirrer-equipped stainless steel-made reaction tank having an internal volume of 1.5 L and purged with a nitrogen gas, 1.0 L of a polymerization solution (butadiene: 31.5% by weight, 2-butenes: 28.8% by weight, cyclohexane: 39.7% by weight) was charged, to which were then added 1.7 mmoles of water, 2.9 mmoles of diethylaluminum chloride, 20.0 mmoles of cyclooctadiene and 0.005 mmoles of cobalt octoate, and the mixture was stirred at 60° C. for 20 minutes, thereby undergoing 1,4-cis-polymerization. An antioxidant ethanol solution was added thereto, thereby stopping the polymerization. Thereafter, the unreacted butadiene and 2-butenes were removed by evaporation, thereby obtaining 81 g of cis-polybutadiene having a Mooney viscosity of 29 and a viscosity in a toluene solution of 48. This operation was performed twice, and 114 g of this cis-polybutadiene was dissolved in cyclohexane, thereby preparing a cyclohexane solution of cis-polybutadiene.

Production of vinyl-cis-polybutadiene rubber of mixture of (A) and (B)

The foregoing cyclohexane solution of cis-polybutadiene having 114 g of cis-polybutadiene dissolved therein was charged in a stirrer-equipped stainless steel-made reaction tank having an internal volume of 5.0 L and purged with a nitrogen gas, to which was then added the foregoing vinyl-cis-polybutadiene cyclohexane slurry containing 58 g of vinyl-cis-polybutadiene while stirring. After adding the slurry, the stirring was continued for one hour, followed by drying in vacuo at 105° C. for 60 minutes, thereby obtaining 172 g of a vinyl-cis-polybutadiene rubber of a mixture of (A) and (B). This polymer mixture had an ML of 56 and an HI of 12.2%.

Example 3-2

A vinyl-cis-polybutadiene rubber was obtained in the same manner as in Example 3-1, except for using a trade name: UBEPOL-BR150L as the cis-polybutadiene rubber manufactured by Ube Industries, Ltd. in (A). This polymer mixture had an ML of 63 and an HI of 12.0%.

Example 3-3

A vinyl-cis-polybutadiene rubber was obtained in the same manner as in Example 3-1, except for using a product of JSR Corporation (a trade name: JSR-BR01) as the cis-polybutadiene rubber in (A). This polymer mixture had an ML of 64 and an HI of 11.7%.

Example 3-4

A vinyl-cis-polybutadiene rubber was obtained in the same manner as in Example 3-1, except for using 30 g of a cis-polybutadiene rubber (a trade name: UBEPOL-BR130B) manufactured by Ube Industries, Ltd. and 10 g of a polyisoprene rubber (a trade name: JSR-IR2200) manufactured by JSR Corporation in (A) (BR+IR=40 g). This polymer mixture had an ML of 58 and an HI of 12.3%.

Comparative Example 3-1

In a stirrer-equipped stainless steel-made reaction tank having an internal volume of 5 L and purged with a nitrogen gas, 3.5 L of a polymerization solution (butadiene: 31.5% by weight, 2-butenes: 28.8% by weight, cyclohexane: 39.7% by weight) was charged, to which were then added 5.3 mmoles of water, 10.5 mmoles of diethylaluminum chloride, 1.8 mmoles of carbon disulfide, 40.0 mmoles of cyclooctadiene and 0.004 mmoles of cobalt octoate, and the mixture was stirred at 40° C. for 20 minutes, thereby undergoing 1,4-cis-polymerization. Thereafter, 560 mL of butadiene, 4.5 mmoles of water, 13.4 mmoles of triethyl aluminum and 0.04 mmoles of cobalt octoate were added, and the mixture was stirred at 60° C. for 20 minutes, thereby undergoing 1,2-syndiotatic polymerization. An antioxidant ethanol solution was added thereto, thereby stopping the polymerization. Thereafter, the unreacted butadiene and 2-butenes were removed by evaporation, followed by drying in vacuo at 105° C. for 60 minutes, thereby obtaining 350 g of a 1,4-cis-1,2-vinyl polymer. This VCR had an ML of 58 and an HI of 11.8%.

Each of the vinyl-cis-polybutadiene rubbers of the foregoing Examples and Comparative Example was subjected to primary compounding by adding thereto and kneading therewith carbon black, a process oil, zinc white, stearic acid and an antioxidant by using a plastomill and subsequently subjected to secondary compounding by the addition of a vulcanization accelerator and sulfur by using a roll according to a compounding table of Table 5, thereby preparing a compounded rubber. By using this compounded rubber, its die swell was measured. In addition, this compounded rubber was molded depending upon the desired physical properties and press vulcanized at 150° C. to obtain a vulcanizate, the physical properties of which were then measured. The measurement results of the respective physical properties are shown in Table 6 while taking the Comparative Example as "100".

TABLE 5

| | Compounding amount (parts by weight) |
|---|---|
| Vinyl-cis-polybutadiene | 100 |
| HAF carbon black | 50 |
| Process oil | 10 |
| Zinc white No. 1 | 5 |
| Stearic acid | 2 |
| Antioxidant (Note 1) | 1 |
| Vulcanization accelerator (Note 2) | 1 |
| Sulfur | 1.5 |

(Note 1) ANTAGE AS (a compound between amine and ketone)
(Note 2) NOCCELER CZ (N-cyclohexyl-2-benzothiazole sulfenamide)

TABLE 6

| | Example | | | | Comparative Example |
|---|---|---|---|---|---|
| | 3-1 | 3-2 | 3-3 | 3-4 | 3-1 |
| Component (A): | | | | | |
| Mooney viscosity of cis-polybutadiene | 29 | 43 | 44 | 29 | — |

TABLE 6-continued

|  | Example | | | | Comparative Example |
|---|---|---|---|---|---|
|  | 3-1 | 3-2 | 3-3 | 3-4 | 3-1 |
| Viscosity in toluene solution of cis-polybutadiene | 30 | 105 | 150 | 30 | — |
| Mooney viscosity of polyisoprene (IR) | — | — | — | 90 | — |
| H.I. (%) | 36.2 | 41.3 | 38.4 | 37.1 | — |
| Component (B): | | | | | |
| Mooney viscosity | 29 | 29 | 29 | 29 | — |
| Viscosity in toluene solution | 48 | 48 | 48 | 48 | — |
| Whole polymer (A + B): | | | | | |
| Mooney viscosity | 58 | 63 | 64 | 58 | 58 |
| IR (%) | — | — | — | 5.2 | — |
| H.I. (%) | 12.2 | 12.0 | 11.7 | 12.3 | 11.8 |
| Physical properties of compounded material: | | | | | |
| Die swell | 95 | 92 | 94 | 93 | 100 |
| Physical properties of vulcanizate: | | | | | |
| Tensile elastic modulus M100 | 117 | 120 | 119 | 118 | 100 |
| Rebound resilience | 102 | 104 | 103 | 102 | 100 |
| Flexometer test: | | | | | |
| Heat build-up ΔT | 98 | 96 | 97 | 97 | 100 |
| Permanent set | 96 | 95 | 96 | 95 | 100 |

Example 4-1

(A) Production of vinyl-cis-polybutadiene

In a stirrer-equipped stainless steel-made reaction tank having an internal volume of 1.5 L, 40 g of a cis-polybutadiene rubber (a trade name: UBEPOL-BR150L) manufactured by Ube Industries, Ltd. and having been reprecipitated and purified was charged, and after purging with a nitrogen gas, 350 mL of cyclohexane was added for dissolution. To this solution, 150 mL of butadiene, 1.1 mmoles of water, 3.5 mmoles of triethyl aluminum and 0.04 mmoles of cobalt octoate were added, and the mixture was stirred at 40° C. for 20 minutes, thereby undergoing to 1,2-syndiotactic polymerization. An antioxidant ethanol solution was added thereto. Thereafter, the unreacted butadiene was removed by evaporation, thereby obtaining vinyl-cis-polybutadiene having an HI of 40.3% in a yield of 67 g. 58 g of this vinyl-cis-polybutadiene was dissolved in cyclohexane to prepare vinyl-cis-polybutadiene slurry.

(B) Production of cis-polybutadiene solution

In a stirrer-equipped stainless steel-made reaction tank having an internal volume of 3.0 L and purged with a nitrogen gas, 2.0 L of cyclohexane was charged and dissolved in 132 g of cis-cis-polybutadiene (a trade name: UBEPOL-BR150L) manufactured by Ube Industries, Ltd. and having an ML viscosity of 43, thereby preparing a solution of cis-polybutadiene cyclohexane.

Production of vinyl-cis-polybutadiene rubber of mixture of (A) and (B):

The foregoing cyclohexane solution of cis-polybutadiene having 132 g of cis-polybutadiene dissolved therein was charged in a stirrer-equipped stainless steel-made reaction tank having an internal volume of 5.0 L and purged with a nitrogen gas, to which was then added the foregoing vinyl-cis-polybutadiene cyclohexane slurry containing 58 g of vinyl-cis-polybutadiene while stirring. After adding the slurry, the stirring was continued for one hour, followed by drying in vacuo at 105° C. for 60 minutes, thereby obtaining 190 g of a vinyl-cis-polybutadiene rubber of a mixture of (A) and (B). This polymer mixture had an ML of 72 and an HI of 12.3%.

Example 4-2

A vinyl-cis-polybutadiene rubber was obtained in the same manner as in Example 4-1, except for using a trade name: UBEPOL-BR130B as the cis-polybutadiene rubber manufactured by Ube Industries, Ltd. in (A). This polymer mixture had an ML of 70 and an HI of 12.0%.

Example 4-3

A vinyl-cis-polybutadiene rubber was obtained in the same manner as in Example 4-1, except for using a product of JSR Corporation (a trade name: JSR-BR01) as the cis-polybutadiene rubber in (B). This polymer mixture had an ML of 74 and an HI of 11.9%.

Example 4-4

A vinyl-cis-polybutadiene rubber was obtained in the same manner as in Example 4-1, except for using 30 g of a cis-polybutadiene rubber (a trade name: UBEPOL-BR150L) manufactured by Ube Industries, Ltd. and 10 g of a polyisoprene rubber (a trade name: JSR-IR2200) manufactured by JSR Corporation in (A) (BR+IR=40 g). This polymer mixture had an ML of 75 and an HI of 12.2%.

Comparative Example 4-1

In a stirrer-equipped stainless steel-made reaction tank having an internal volume of 5 L and purged with a nitrogen gas, 3.5 L of a polymerization solution (butadiene: 31.5% by weight, 2-butenes: 28.8% by weight, cyclohexane: 39.7% by weight) was charged, to which were then added 5.3 mmoles of water, 10.5 mmoles of diethylaluminum chloride, 1.8 mmoles of carbon disulfide, 40.0 mmoles of cyclooctadiene and 0.004 mmoles of cobalt octoate, and the mixture was stirred at 40° C. for 20 minutes, thereby undergoing 1,4-cis-polymerization. Thereafter, 560 mL of butadiene, 4.5 mmoles of water, 13.4 mmoles of triethyl aluminum and 0.04 mmoles of cobalt octoate were added, and the mixture was stirred at 60° C. for 20 minutes, thereby undergoing 1,2-syndiotatic polymerization. An antioxidant ethanol solution was added thereto, thereby stopping the polymerization. Thereafter, the unreacted butadiene and 2-butenes were removed by evaporation, followed by drying in vacuo at 105° C. for 60 minutes, thereby obtaining 350 g of a 1,4-cis-1,2-vinyl polymer. This VCR had an ML of 58.0 and an HI of 11.8%.

Each of the vinyl-cis-polybutadiene rubbers of the foregoing Examples and Comparative Example was subjected to primary compounding by adding thereto and kneading therewith carbon black, a process oil, zinc white, stearic acid and an antioxidant by using a plastomill and subsequently subjected to secondary compounding by the addition of a vulcanization accelerator and sulfur by using a roll according to a compounding table of Table 7, thereby preparing a compounded rubber. By using this compounded rubber, its die swell was measured. In addition, this compounded rubber was molded depending upon the desired physical properties and press vulcanized at 150° C. to obtain a vulcanizate, the physical properties of which were then measured. The measurement results of the respective physical properties are shown in Table 8 while taking the Comparative Example as "100".

TABLE 7

| | Compounding amount (parts by weight) |
|---|---|
| Vinyl-cis-polybutadiene | 100 |
| HAF carbon black | 50 |
| Process oil | 10 |
| Zinc white No. 1 | 5 |
| Stearic acid | 2 |
| Antioxidant (Note 1) | 1 |
| Vulcanization accelerator (Note 2) | 1 |
| Sulfur | 1.5 |

(Note 1) ANTAGE AS (a compound between amine and ketone)
(Note 2) NOCCELER CZ (N-cyclohexyl-2-benzothiazole sulfenamide)

TABLE 8

| | Example | | | | Comparative Example |
|---|---|---|---|---|---|
| | 4-1 | 4-2 | 4-3 | 4-4 | 3-1 |
| Component (A): | | | | | |
| Mooney viscosity of cis-polybutadiene | 29 | 43 | 44 | 29 | — |
| Viscosity in toluene solution of cis-polybutadiene | 30 | 105 | 150 | 30 | — |
| Mooney viscosity of polyisoprene (IR) | — | — | — | 90 | — |
| H.I. (%) | 36.2 | 41.3 | 38.4 | 37.1 | — |
| Component (B): | | | | | |
| Mooney viscosity | 29 | 29 | 29 | 29 | — |
| Viscosity in toluene solution | 48 | 48 | 48 | 48 | — |
| Whole polymer (A + B): | | | | | |
| Mooney viscosity | 56 | 63 | 64 | 58 | 58 |
| IR (%) | — | — | — | 5.2 | — |
| H.I. (%) | 12.2 | 12.0 | 11.7 | 12.3 | 11.8 |
| Physical properties of compounded material: | | | | | |
| Die swell | 95 | 92 | 94 | 95 | 100 |
| Physical properties of vulcanizate: | | | | | |
| Tensile elastic modulus M100 | 117 | 120 | 119 | 118 | 100 |
| Rebound resilience | 102 | 104 | 103 | 102 | 100 |
| Flexometer test: | | | | | |
| Heat build-up ΔT | 98 | 96 | 97 | 97 | 100 |
| Permanent set | 96 | 95 | 96 | 95 | 100 |

Example 5

Rubber Composition for Sidewall

Production of vinyl-cis-polybutadiene sample 1
(A) Production of vinyl-cis-polybutadiene:

In a stirrer-equipped stainless steel-made reaction tank having an internal volume of 1.5 L and purged with a nitrogen gas, 1.0 L of a polymerization solution (butadiene: 31.5% by weight, 2-butenes: 28.8% by weight, cyclohexane: 39.7% by weight) was charged, to which were then added 1.7 mmoles of water, 2.9 mmoles of diethylaluminum chloride, 0.3 mmoles of carbon disulfide, 13.0 mmoles of cyclooctadiene and 0.005 mmoles of cobalt octoate, and the mixture was stirred at 40° C. for 20 minutes, thereby undergoing 1,4-cis-polymerization. At this time, a small amount of the cis-polybutadiene polymerization solution was taken out from the reaction tank and dried, and the viscosity in a toluene solution of the resulting cis-polybutadiene rubber was measured and found to be 175. Thereafter, 150 mL of butadiene, 1.1 mmoles of water, 3.5 mmoles of triethyl aluminum and 0.04 mmoles of cobalt octoate were added, and the mixture was stirred at 40° C. for minutes, thereby undergoing to 1,2-syndiotactic polymerization. An antioxidant ethanol solution was added thereto. Thereafter, the unreacted butadiene and 2-butenes were removed by evaporation, thereby obtaining vinyl-cis-polybutadiene having an HI of 40.5% in a yield of 66 g. 58 g of this vinyl-cis-polybutadiene was dissolved in cyclohexane to prepare vinyl-cis-polybutadiene slurry.

(B) Production of cis-polybutadiene:

In a stirrer-equipped stainless steel-made reaction tank having an internal volume of 1.5 L and purged with a nitrogen gas, 1.0 L of a polymerization solution (butadiene: 31.5% by weight, 2-butenes: 28.8% by weight, cyclohexane: 39.7% by weight) was charged, to which were then added 1.7 mmoles of water, 2.9 mmoles of diethylaluminum chloride, 20.0 mmoles of cyclooctadiene and 0.005 mmoles of cobalt octoate, and the mixture was stirred at 60° C. for 20 minutes, thereby undergoing 1,4-cis-polymerization. An antioxidant ethanol solution was added thereto, thereby stopping the polymerization. Thereafter, the unreacted butadiene and 2-butenes were removed by evaporation, thereby obtaining 81 g of cis-polybutadiene having a Mooney viscosity of 29.0 and a viscosity in a toluene solution of 48.3. This operation was performed twice, and 162 g in total of cis-polybutadiene was dissolved in cyclohexane, thereby preparing a cyclohexane solution of cis-polybutadiene.

Production of vinyl-cis-polybutadiene rubber of mixture of (A) and (B)

The foregoing cyclohexane solution of cis-polybutadiene having 162 g of cis-polybutadiene dissolved therein was charged in a stirrer-equipped stainless steel-made reaction tank having an internal volume of 5.0 L and purged with a nitrogen gas, to which was then added the foregoing vinyl-cis-polybutadiene cyclohexane slurry containing 58 g of vinyl-cis-polybutadiene while stirring. After adding the slurry, the stirring was continued for one hour, followed by drying in vacuo at 105° C. for 60 minutes, thereby obtaining 220 g of a vinyl-cis-polybutadiene rubber of a mixture of (A) and (B). This polymer mixture had an ML of 61.1 and an HI of 11.9%.

Production of vinyl-cis-polybutadiene sample 2

In a stirrer-equipped stainless steel-made reaction tank having an internal volume of 5 L and purged with a nitrogen gas, 3.5 L of a polymerization solution (butadiene: 31.5% by weight, 2-butenes: 28.8% by weight, cyclohexane: 39.7% by weight) was charged, to which were then added 5.3 mmoles of water, 10.5 mmoles of diethylaluminum chloride, 1.8 mmoles of carbon disulfide, 40.0 mmoles of cyclooctadiene and 0.004 mmoles of cobalt octoate, and the mixture was stirred at 40° C. for 20 minutes, thereby undergoing 1,4-cis-polymerization. Thereafter, 560 mL of butadiene, 4.5 mmoles of water, 13.4 mmoles of triethyl aluminum and 0.04 mmoles of cobalt octoate were added, and the mixture was stirred at 40° C. for 20 minutes, thereby undergoing 1,2-syndiotatic polymerization. An antioxidant ethanol solution was added thereto, thereby stopping the polymerization. Thereafter, the unreacted butadiene and 2-butenes were removed by evaporation, followed by drying in vacuo at 105° C. for 60 minutes, thereby obtaining 350 g of a 1,4-cis-1,2-vinyl polymer. This VCR had an ML of 58.0 and an HI of 11.8%.

Physical properties of the foregoing sample 1 and sample 2 are shown in Table 9.

TABLE 9

|  | Sample 1 | Sample 2 |
|---|---|---|
| Sample (A): | | |
| Viscosity in toluene solution of cis-polybutadiene | 175 | — |
| H.I. (%) | 40.5 | — |
| Component (B): | | |
| Mooney viscosity | 29 | — |
| Viscosity in toluene solution | 48.3 | — |
| Whole polymer: | | |
| Viscosity in toluene solution of cis-polybutadiene | — | 49.9 |
| Mooney viscosity | 61.1 | 58.8 |
| H.I. (%) | 11.9 | 11.8 |

Examples 5-1 to 5-5

Comparative Examples 5-1 to 5-3

By using each of the foregoing sample 1 and sample 2, compounding agents other than a vulcanization accelerator and sulfur in a compounding preparation as shown in Table 10 were kneaded by using a 1.7-L Banbury mixer for testing, thereby obtaining a kneaded material which is a rubber composition for sidewall. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 10.

In the table, the respective die swell, 300% tensile elastic modulus and low fuel consumption values are relative values with respect to those in Comparative Example 5-1. Incidentally, in Comparative Example 5-1, the die swell was 2.27; the 300% tensile elastic modulus was 9.7 MPa; and with respect to the low fuel consumption, a temperature rise of 14.7° C. was observed.

The compositions of the Examples are greatly improved with respect to the elastic modulus and highly balanced between the die swell and the low fuel consumption as compared with those of the Comparative Examples. On the other hand, in the compositions of the Comparative Examples, when the compounding amount of carbon black is high, the exothermic characteristic was deteriorated. Furthermore, when vinyl-cis-polybutadiene which is not satisfied in the invention is used, or the amount of use of vinyl-cis-polybutadiene of the invention is low, the improvement effects did not reached the expected levels.

TABLE 10

| | Example | | | | | Comparative Example | | |
|---|---|---|---|---|---|---|---|---|
| Compounding table | 5-1 | 5-2 | 5-3 | 5-4 | 5-5 | 5-1 | 5-2 | 5-3 |
| Kind of vinyl-cis-polybutadiene | Sample 1 | Sample 1 | Sample 1 | Sample 1 | Sample 1 | Sample 2 | Sample 1 | Sample 1 |
| Amount (parts) | 60 | 60 | 60 | 80 | 40 | 60 | 60 | 10 |
| NR (Note 1) | 40 | 40 | 40 | 20 | 60 | 40 | 40 | 90 |
| Carbon black N330 | 40 | 55 | 30 | 40 | 40 | 40 | 70 | 40 |
| Aromatic oil | 10 | 10 | 10 | 10 | 10 | 10 | 10 | 10 |
| Zinc oxide | 3 | 3 | 3 | 3 | 3 | 3 | 3 | 3 |
| Stearic acid | 2 | 2 | 2 | 2 | 2 | 2 | 2 | 2 |
| Antioxidant (Note 2) | 1 | 1 | 1 | 1 | 1 | 1 | 1 | 1 |
| Vulcanization accelerator (Note 3) | 1.0 | 1.0 | 1.0 | 0.9 | 0.8 | 1.0 | 1.0 | 0.7 |
| Sulfur | 1.5 | 1.5 | 1.5 | 1.7 | 2.0 | 1.5 | 1.5 | 2.2 |
| Physical properties of compounded material: | | | | | | | | |
| Die swell index | 87 | 77 | 97 | 82 | 96 | 100 | 73 | 115 |
| Physical properties of vulcanizate: | | | | | | | | |
| 300% tensile elastic modulus (index) | 131 | 162 | 111 | 113 | 126 | 100 | 179 | 80 |
| Low fuel consumption (index) | 85 | 93 | 76 | 80 | 88 | 100 | 109 | 103 |

(Note 1) NR: RSS#1

(Note 2) Antioxidant: ANTAGE AS (a reaction product between amine and ketone)

(Note 3) Vulcanization accelerator: NOCCELER CZ (N-cyclohexyl-2-benzothiazole sulfenamide)

Examples 6-1 to 6-4

Comparative Examples 6-1 to 6-2

Silica Compounded Rubber Composition for Tire

By using each of the foregoing sample 1 and sample 2, compounding agents other than a vulcanization accelerator and sulfur in a compounding preparation as shown in Table 11 were kneaded by using a 1.7-L Banbury mixer for testing, thereby obtaining a kneaded material which is a rubber composition for sidewall. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 11.

In the table, the respective die swell, Pico abrasion, wet skid properties and low fuel consumption values are relative values with respect to those in Comparative Example 6-1. Incidentally, in Comparative Example 6-1, the die swell was 2.69; the Pico abrasion was 156; the wet skid properties were 46; and with respect to the low fuel consumption, a temperature rise of 15° C. was observed.

The compositions of the Examples realize a small die swell, high abrasion resistance and low fuel consumption while keeping wet skid properties as compared with those of the Comparative Examples. On the other hand, in the compositions of the Comparative Examples, in the case where vinyl-cis-polybutadiene which is not satisfied in the invention is used, or the amount of addition of silica is low, while a small die swell and high abrasion resistance are realized, a remarkable lowering of the wet skid properties is caused, whereby the desired characteristics cannot be obtained.

Examples 7-1 to 7-4

Comparative Examples 7-1 to 7-3

Rubber Composition for Passenger Automobile Tire

By using each of the foregoing sample 1 and sample 2, compounding agents other than a vulcanization accelerator and sulfur in a compounding preparation as shown in Table 12 were kneaded by using a 1.7-L Banbury mixer for testing, thereby obtaining a kneaded material which is a rubber composition for sidewall. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 12.

In the table, the respective die swell, 300% tensile elastic modulus, Pico abrasion and wet skid properties values are relative values with respect to those in Comparative Example 7-1. Incidentally, in Comparative Example 7-1, the die swell was 2.02; the 300% tensile elastic modulus was 18.4 MPa; the Pico abrasion was 181; and the wet skid properties were 44.

The compositions of the Examples realize a high elastic modulus and high abrasion resistance while keeping wet skid properties as compared with those of the Comparative Examples. On the other hand, in the compositions of the Comparative Examples, in the case where the amount of use of vinyl-cis-polybutadiene of the invention is high, vinyl-cis-polybutadiene which is not satisfied in the invention is used, or the amount of addition of SBR is low, while a high elastic modulus and high abrasion resistance are realized, a remarkable lowering of the wet skid properties is caused, whereby the desired characteristics cannot be obtained.

TABLE 11

| Compounding table | Example | | | | Comparative Example | |
|---|---|---|---|---|---|---|
| | 6-1 | 6-2 | 6-3 | 6-4 | 6-1 | 6-2 |
| Kind of vinyl-cis-polybutadiene | Sample 1 | Sample 1 | Sample 1 | Sample 1 | Sample 2 | Sample 1 |
| Amount (parts) | 35 | 35 | 45 | 35 | 35 | 35 |
| NR (Note 1) | — | 25 | 15 | — | — | — |
| SRB1500 | 65 | 40 | 40 | 65 | 65 | 65 |
| Carbon black N330 | 27 | 27 | 27 | 21.5 | 27 | 60 |
| Silica (Note 2) | 30 | 30 | 30 | 35 | 30 | — |
| Silane coupling agent (Note 3) | 6 | 6 | 6 | 7 | 6 | — |
| Aromatic oil | 15 | 15 | 15 | 15 | 15 | 15 |
| Zinc oxide | 5 | 5 | 5 | 5 | 5 | 3 |
| Stearic acid | 2 | 2 | 2 | 2 | 2 | 2 |
| Antioxidant (Note 4) | 1 | 1 | 1 | 1 | 1 | 1 |
| Vulcanization accelerator (Note 5) | 1.3 | 1.3 | 1.3 | 1.4 | 1.3 | 1 |
| Vulcanization accelerator (Note 6) | 0.7 | 0.7 | 0.7 | 0.9 | 0.7 | — |
| Sulfur | 2 | 2 | 2 | 2.1 | 2 | 1.8 |
| Physical properties of compounded material: | | | | | | |
| Die swell index | 86 | 92 | 91 | 92 | 100 | 83 |
| Physical properties of vulcanizate | | | | | | |
| Pico abrasion (index) | 108 | 100 | 113 | 102 | 100 | 116 |
| Wet skid properties (index) | 105 | 104 | 104 | 105 | 100 | 97 |
| Low fuel consumption (index) | 88 | 84 | 81 | 84 | 100 | 110 |

(Note 1) NR: RSS#1
(Note 2) BR: Polybutadiene (UBEPOL-BR150, manufacture by Ube Industries, Ltd.)
(Note 3) Ultrasil VN3 GR (manufactured by Degussa)
(Note 4) X5OS (Equal-amount mixture of N330 and Si69, manufactured by Degussa) Si69: Bis(3-triethoxysilylpropyl)-tetrasulfide
(Note 5) Antioxidant: ANTAGE AS (a reaction product between amine and ketone)
(Note 6) Vulcanization accelerator: NOCCELER CZ (N-cyclohexyl-2-benzothiazole sulfenamide)
(Note 7) Vulcanization accelerator: NOCCELER D (N,N'-diphenylguanidine)

TABLE 12

| Compounding table | Example 7-1 | Example 7-2 | Example 7-3 | Example 7-4 | Comparative Example 7-1 | Comparative Example 7-2 | Comparative Example 7-3 |
|---|---|---|---|---|---|---|---|
| Kind of vinyl-cis-polybutadiene | Sample 1 | Sample 1 | Sample 1 | Sample 1 | Sample 2 | Sample 1 | Sample 1 |
| Amount (parts) | 35 | 35 | 45 | 20 | 35 | 35 | 65 |
| NR (Note 1) | — | 25 | 15 | 40 | — | 55 | — |
| SBR1500 | 65 | 40 | 40 | 40 | 65 | 10 | 35 |
| Carbon black N330 | 60 | 60 | 60 | 60 | 60 | 60 | 60 |
| Aromatic oil | 15 | 15 | 15 | 15 | 15 | 15 | 15 |
| Zinc oxide | 3 | 3 | 3 | 3 | 3 | 3 | 3 |
| Stearic acid | 2 | 2 | 2 | 2 | 2 | 2 | 2 |
| Antioxidant (Note 2) | 1 | 1 | 1 | 1 | 1 | 1 | 1 |
| Vulcanization accelerator (Note 3) | 1.5 | 1.2 | 1.3 | 1.2 | 1.5 | 1.0 | 1.3 |
| Sulfur | 1.8 | 1.9 | 1.8 | 2.0 | 1.8 | 2.0 | 1.7 |
| Physical properties of compounded material | | | | | | | |
| Die swell index | 85 | 93 | 84 | 96 | 100 | 102 | 76 |
| Physical properties of vulcanizate | | | | | | | |
| 300% tensile elastic modulus (index) | 123 | 117 | 128 | 105 | 100 | 107 | 140 |
| Pico abrasion (index) | 108 | 99 | 112 | 93 | 100 | 84 | 116 |
| Wet skid properties (index) | 105 | 102 | 100 | 103 | 100 | 95 | 95 |

(Note 1) NR: RSS#1
(Note 2) Antioxidant: ANTAGE AS (a reaction product between amine and ketone)
(Note 3) Vulcanization accelerator: NOCCELER CZ (N-cyclohexyl-2-benzothiazole sulfenamide)

Examples 8-1 to 8-3

Comparative Example 8-1

Rubber Composition for Tire Cord Coating

By using each of the foregoing sample 1 and sample 2, compounding agents other than a vulcanization accelerator and sulfur in a compounding preparation as shown in Table 13 were kneaded by using a 1.7-L Banbury mixer for testing, thereby obtaining a kneaded material which is a rubber composition for sidewall. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 13.

In the table, the respective die swell, 100% green modulus, 300% tensile elastic modulus, tensile strength and adhesive strength to metal values are relative values with respect to those in Comparative Example 8-1. Incidentally, in Comparative Example 8-1, the die swell was 2.12; the 100% green modulus was 0.6 MPa; the 300% tensile elastic modulus was 18.5 MPa; the tensile strength was 28.9 MPa; and the adhesive strength to metal was 12 kg.

The compositions of the Examples have a small die swell and largely improved green modulus while keeping a high elastic modulus and are excellent in adhesiveness to metals.

TABLE 13

| Compounding table | Example 8-1 | Example 8-2 | Example 8-3 | Comparative Example 8-1 |
|---|---|---|---|---|
| Kind of vinyl-cis-polybutadiene | Sample 1 | Sample 1 | Sample 1 | Sample 2 |
| Amount (parts) | 35 | 20 | 35 | 35 |
| NR (Note 1) | 65 | 80 | 65 | 65 |
| Carbon black N330 | 60 | 60 | 50 | 60 |
| Zinc oxide | 7 | 7 | 7 | 7 |
| Stearic acid | 2 | 2 | 2 | 2 |
| Cobalt stearate | 3 | 3 | 3 | 3 |
| Antioxidant (Note 2) | 2 | 2 | 2 | 2 |
| Vulcanization accelerator (Note 3) | 0.8 | 0.8 | 0.8 | 0.8 |
| Sulfur | 1.5 | 1.5 | 1.5 | 1.5 |
| Physical properties of compounded material: | | | | |
| Die swell (index) | 82 | 91 | 89 | 100 |
| 100% green modulus (index) | 122 | 110 | 104 | 100 |
| Physical properties of vulcanizate: | | | | |
| 300% tensile elastic modulus (index) | 128 | 111 | 104 | 100 |
| Tensile strength (index) | 108 | 104 | 102 | 100 |
| Adhesive strength to metal (index) | 110 | 108 | 106 | 100 |

(Note 1) NR: RSS#1
(Note 2) Antioxidant: ANTAGE AS (a reaction product between amine and ketone)
(Note 3) Vulcanization accelerator: NOCCELER CZ (N-cyclo-hexyl-2-benzothiazole sulfenamide)

Examples 9-1 to 9-5

Comparative Examples 9-1 to 9-4

Rubber Composition for Base Stread

By using each of the foregoing sample 1 and sample 2, compounding agents other than a vulcanization accelerator and sulfur in a compounding preparation as shown in Table 14 were kneaded by using a 1.7-L Banbury mixer for testing, thereby obtaining a kneaded material which is a rubber composition for sidewall. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 14.

In the table, the respective die swell, 100% green modulus, 300% tensile elastic modulus and exothermic characteristic values are relative values with respect to those in Comparative Example 9-1. Incidentally, in Comparative Example 9-1, the die swell was 2.25; the 300% tensile elastic modulus was 10.1 MPa; and with respect to the exothermic characteristic, a temperature rise of 16.5° C. was observed.

The compositions of the Examples are greatly improved with respect to the elastic modulus and highly balanced between the die swell and the exothermic characteristic. On the other hand, in the compositions of the Comparative Examples, when the compounding amount of carbon black is high, the exothermic characteristic is deteriorated. Furthermore, when the compounding amount of carbon black is low, the die swell and the elastic modulus are largely deteriorated. Furthermore, when the amount of use of vinyl-cis-polybutadiene of the invention is low, the improvement effects did not reached the expected levels.

Examples 10-1 to 10-5

Comparative Example 10-1

High-Hardness Compounded Rubber Composition

By using each of the foregoing sample 1 and sample 2, compounding agents other than a vulcanization accelerator and sulfur in a compounding preparation as shown in Table 15 were kneaded by using a 1.7-L Banbury mixer for testing, thereby obtaining a kneaded material which is a rubber composition for sidewall. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 15.

In the table, the respective die swell, hardness and low exothermic characteristics values are relative values with respect to those in Comparative Example 10-1. Incidentally, in Comparative Example 10-1, the die swell was 1.50; the hardness was 78; with respect to the low exothermic characteristics, a temperature rise of 45° C. was observed.

The compositions of the Examples have largely improved die swell and exothermic characteristics while keeping a high hardness.

TABLE 14

| Compounding table | Example | | | | | Comparative Example | | | |
|---|---|---|---|---|---|---|---|---|---|
| | 9-1 | 9-2 | 9-3 | 9-4 | 9-5 | 9-1 | 9-2 | 9-3 | 9-4 |
| Kind of vinyl-cis-polybutadiene | Sample 1 | Sample 1 | Sample 1 | Sample 1 | Sample 1 | Sample 2 | Sample 1 | Sample 1 | Sample 1 |
| Amount (parts) | 50 | 70 | 30 | 50 | 50 | 50 | 50 | 50 | 10 |
| NR (Note 1) | 50 | 30 | 70 | 50 | 50 | 50 | 50 | 50 | 90 |
| Carbon black N330 | 40 | 40 | 40 | 50 | 35 | 40 | 60 | 20 | 40 |
| Aromatic oil | 10 | 10 | 10 | 10 | 10 | 10 | 10 | 10 | 10 |
| Zinc oxide | 5 | 5 | 5 | 5 | 5 | 5 | 5 | 5 | 5 |
| Stearic acid | 2 | 2 | 2 | 2 | 2 | 2 | 2 | 2 | 2 |
| Antioxidant (Note 2) | 1 | 1 | 1 | 1 | 1 | 1 | 1 | 1 | 1 |
| Vulcanization accelerator (Note 3) | 1.0 | 0.9 | 0.8 | 1.0 | 1.0 | 1.0 | 1.0 | 1.0 | 0.7 |
| Sulfur | 1.5 | 1.7 | 2.0 | 1.5 | 1.5 | 1.5 | 1.5 | 1.5 | 2.2 |
| Physical properties of compounded material: | | | | | | | | | |
| Die swell index | 83 | 76 | 97 | 74 | 92 | 100 | 72 | 117 | 107 |
| Physical properties of vulcanizate: | | | | | | | | | |
| 300% tensile elastic modulus (index) | 137 | 149 | 106 | 147 | 120 | 100 | 157 | 80 | 82 |
| Exothermic characteristic (index) | 84 | 80 | 89 | 96 | 77 | 100 | 112 | 90 | 100 |

(Note 1) NR: RSS#1
(Note 2) Antioxidant: ANTAGE AS (a reaction product between amine and ketone)
(Note 3) Vulcanization accelerator: NOCCELER CZ (N-cyclohexyl-2-benzothiazole sulfenamide)

TABLE 15

| Compounding table | Example 10-1 | Example 10-2 | Example 10-3 | Example 10-4 | Example 10-5 | Comparative Example 10-1 |
|---|---|---|---|---|---|---|
| Kind of vinyl-cis-polybutadiene | Sample 1 | Sample 1 | Sample 1 | Sample 1 | Sample 1 | Sample 2 |
| Amount (parts) | 50 | 70 | 30 | 50 | 50 | 50 |
| NR (Note 1) | 50 | 30 | 70 | 50 | 50 | 50 |
| Carbon black N330 | 70 | 70 | 70 | 60 | 80 | 70 |
| Aromatic oil | 5 | 5 | 5 | 10 | 10 | 5 |
| Zinc oxide | 5 | 5 | 5 | 3 | 3 | 5 |
| Stearic acid | 2 | 2 | 2 | 2 | 2 | 2 |
| Antioxidant (Note 2) | 1 | 1 | 1 | 1 | 1 | 1 |
| Vulcanization accelerator (Note 3) | 1.0 | 1.2 | 0.8 | 1.0 | 1.0 | 1.0 |
| Sulfur | 3.0 | 2.8 | 3.2 | 3.0 | 3.0 | 3.0 |
| Physical properties of compounded material: | | | | | | |
| Die swell index | 84 | 76 | 96 | 93 | 73 | 100 |
| Physical properties of vulcanizate: | | | | | | |
| Hardness (index) | 106 | 113 | 103 | 103 | 108 | 100 |
| Low exothermic characteristics (index) | 87 | 80 | 92 | 78 | 91 | 100 |

(Note 1) NR: RSS#1
(Note 2) Antioxidant: ANTAGE AS (a reaction product between amine and ketone)
(Note 3) Vulcanization accelerator: NOCCELER CZ (N-cyclohexyl-2-benzothiazole sulfenamide)

Examples 11-1 to 11-3

Comparative Example 11-1

Rubber Composition for Large-Sized Vehicle Tire

By using each of the foregoing sample 1 and sample 2, compounding agents other than a vulcanization accelerator and sulfur in a compounding preparation as shown in Table 16 were kneaded by using a 1.7-L Banbury mixer for testing, thereby obtaining a kneaded material which is a rubber composition for sidewall. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 16.

In the table, the respective die swell, 300% tensile elastic modulus, Pico abrasion and wet skid properties values are relative values with respect to those in Comparative Example 11-1. Incidentally, in Comparative Example 11-1, the die swell was 1.81; the 300% tensile elastic modulus was 16.3 MPa; the Pico abrasion was 226; and the wet skid properties were 40.

The compositions of the Examples have a small die swell and have excellent wet skid properties and abrasion resistance while keeping a high elastic modulus as compared with that of the Comparative Example. On the other hand, in the composition of the Comparative Example, since vinyl-cis-polybutadiene which is not satisfied in the invention is used, the abrasion resistance is not enhanced, or the wet skid properties are lowered, whereby the desired characteristics cannot be obtained.

TABLE 16

| Compounding table | Example 11-1 | Example 11-2 | Example 11-3 | Comparative Example 11-1 |
|---|---|---|---|---|
| Kind of vinyl-cis-polybutadiene | Sample 1 | Sample 1 | Sample 1 | Sample 2 |
| Amount (parts) | 30 | 20 | 30 | 30 |
| NR (Note 1) | 70 | 80 | 70 | 70 |
| Carbon black N330 | 60 | 60 | 50 | 60 |
| Aromatic oil | 10 | 10 | 10 | 10 |
| Zinc oxide | 3 | 3 | 3 | 3 |
| Stearic acid | 2 | 2 | 2 | 2 |
| Antioxidant (Note 2) | 1 | 1 | 1 | 1 |
| Vulcanization accelerator (Note 3) | 0.8 | 0.8 | 0.8 | 0.8 |
| Sulfur | 1 | 1 | 1 | 1 |
| Physical properties of compounded material: | | | | |
| Die swell (index) | 84 | 91 | 90 | 100 |
| Physical properties of vulcanizate: | | | | |
| 300% tensile elastic modulus (index) | 125 | 111 | 106 | 100 |
| Pico abrasion (index) | 113 | 105 | 101 | 100 |
| Wet skid properties (index) | 105 | 108 | 107 | 100 |

(Note 1) NR: RSS#1
(Note 2) Antioxidant: ANTAGE AS (a reaction product between amine and ketone)
(Note 3) Vulcanization accelerator: NOCCELER CZ (N-cyclo-hexyl-2-benzothiazole sulfenamide)

According to the invention, as compared with the conventional vinyl-cis-polybutadiene rubber, vinyl-cis-polybutadiene having satisfactory processability and having excellent exothermic characteristics and rebound resilience can be produced. When the vinyl-cis-polybutadiene obtained by the invention is used for tire application, in the production step, the workability of tire manufacture is enhanced due to its excellent extrusion processability so that it becomes possible to realize low fuel consumption of the completed tire.

Also, according to the invention, it is possible to provide a rubber composition for sidewall having low fuel consumption with respect to a vulcanizate thereof and having a small die swell.

Also, according to the invention, it is possible to provide a silica compounded rubber composition for tire having excellent extrusion processability and having satisfactory wet skid properties and abrasion resistance while keeping a high elastic modulus.

Also, according to the invention, it is possible to provide a tire for passenger automobile having excellent extrusion molding processability and having satisfactory high-speed running properties, grip properties on a wet road surface and abrasion resistance by using a rubber composition for cap tread having excellent extrusion processability while keeping a high elastic modulus.

Also, according to the invention, it is possible to provide a rubber composition for tire cord coating of carcasses, belts, beads, etc. having a small die swell, a large green strength and excellent molding processability and having a large elastic modulus with respect to a vulcanizate thereof.

Also, according to the invention, it is possible to provide a rubber composition for base tread having low exothermic characteristics with respect to a vulcanizate thereof and having a small die swell.

Also, according to the invention, it is possible to provide a rubber composition capable of improving dimensional stability at the time of extrusion processing and durability with respect to a tire thereof while keeping a high hardness.

Also, according to the invention, it is possible to provide a rubber composition for large-sized vehicle having excellent moldability and having satisfactory high-speed running properties, wet skid properties and abrasion resistance by using a rubber composition for cap tread having a small die swell and excellent extrusion processability while keeping a high elastic modulus.

The invention claimed is:

1. A process for producing a vinyl-cis-polybutadiene rubber, which comprises mixing (A) and (B), wherein
   (A) comprises a vinyl-cis-polybutadiene solution where a proportion (HI) of a boiling n-hexane insoluble matter of the vinyl-cis-polybutadiene is from 30 to 60% by weight, the vinyl-cis-polybutadiene being obtained by
      (1) a step of adding a cis-1,4-polymerization catalyst, comprising a first organoaluminum compound and a soluble cobalt compound, to a mixture containing 1,3-butadiene and a cyclohexane solvent as major components, where a water content is adjusted to a range of 0.1 to 1.0 moles of water per mole of the first organoaluminum compound, thereby subjecting the 1,3-butadiene to cis-1,4-polymerization to obtain a resulting polymerization reaction mixture, and
      (2) a step of exposing a second catalyst to the resulting polymerization reaction mixture, thereby subjecting 1,3-butadiene to 1,2-polymerization, wherein the second catalyst comprises a soluble cobalt compound, a second organoaluminum compound represented by the general formula $AlR_3$, and carbon disulfide, and wherein R represents an alkyl group having from 1 to 6 carbon atoms, a phenyl group, or a cycloalkyl group, and wherein
   (B) comprises a cis-polybutadiene solution obtained by a step of adding said cis-1,4-polymerization catalyst to 1,3-butadiene to subject the 1,3-butadiene to cis-1,4-polymerization.

2. The process according to claim 1, wherein the second catalyst comprises, based on the resulting polymerization reaction mixture, 0.1 to 50 mmol of the second organoaluminum compound per mole of 1,3-butadiene and 0.01 to 10 mmol/L of the carbon disulfide.

3. A process for producing a vinyl-cis-polybutadiene rubber, which comprises mixing (A) and (B), wherein
   (A) comprises a vinyl-cis-polybutadiene solution where a proportion (HI) of a boiling n-hexane insoluble matter of the vinyl-cis-polybutadiene is from 10 to 60% by weight, the vinyl-cis-polybutadiene being obtained by dissolving at least one member selected from the group consisting of previously polymerized polyisoprene, liquid polyisoprene, crystalline polybutadiene having a melting point of not higher than 150° C., liquid polybutadiene, a styrene-isoprene-styrene compound, and derivatives thereof, in a mixture containing 1,3-butadiene and a cyclohexane solvent as major components, and by
      (1) a step of adding a cis-1,4-polymerization catalyst comprising a first organoaluminum compound and a soluble cobalt catalyst, a nickel catalyst, or a lanthanoid catalyst, to the mixture containing 1,3-butadiene and cyclohexane solvent as major components, wherein a water content is adjusted to a range of 0.1 to 1.0 moles of water per mole of the first organoaluminum compound, thereby subjecting the 1,3-butadiene to cis-1,4-polymerization to obtain a resulting polymerization reaction mixture, and
      (2) a step of exposing a second catalyst comprising a soluble cobalt compound, a second organoaluminum compound represented by the general formula $AlR_3$, and carbon disulfide, to the resulting polymerization reaction mixture, thereby subjecting the 1,3-butadiene to 1,2-polymerization, wherein R represents an alkyl group having from 1 to 6 carbon atoms, a phenyl group, or a cycloalkyl group, and wherein
   (B) comprises a cis-polybutadiene solution obtained by a step of dissolving cis-polybutadiene containing 80% or more of a cis-1,4-bond and having a Mooney viscosity ($ML_{1+4}$ at 100° C.) of from 20 to 80 in a mixture containing 1,3-butadiene and/or cyclohexane solvent as a major component, wherein the cis-polybutadiene comprises a single kind or a blend of two or more kinds of cis-polybutadiene obtained by polymerization of 1,3-butadiene with a soluble cobalt catalyst, a nickel catalyst, or a lanthanoid catalyst.

4. The process according to claim 3, wherein the second catalyst comprises, based on the resulting polymerization reaction mixture, 0.1 to 50 mmol of the second organoaluminum compound per mole of 1,3-butadiene and 0.01 to 10 mmol/L of the carbon disulfide.

5. A process for producing a vinyl-cis-polybutadiene rubber, which comprises mixing (A) and (B), wherein
   (A) comprises a vinyl-cis-polybutadiene solution where a proportion (HI) of a boiling n-hexane insoluble matter of the vinyl-cis-polybutadiene is from 30 to 60% by weight, the vinyl-cis-polybutadiene being obtained by
      (1) a step of dissolving cis-polybutadiene containing 80% or more of a cis-1,4-bond and having a Mooney viscosity (ML$_{1+4}$ at 100° C.) of from 20 to 80 in a mixture containing 1,3-butadiene and a cyclohexane solvent as the major components to obtain a resulting cis-polybutadiene solution, wherein the cis-polybutadiene comprises a single kind or a blend of two or more kinds of cis-polybutadiene obtained by polymerization of 1,3-butadiene with a cobalt catalyst or a nickel catalyst or a lanthanoid catalyst, and (2) a step of exposing a 1,2-polymerization catalyst to the resulting cis-polybutadiene solution, thereby subjecting 1,3-butadiene to 1,2-polymerization, wherein the 1,2-polymerization catalyst comprises a soluble cobalt compound, an organoaluminum compound represented by the general formula AlR$_3$ and carbon disulfide, wherein R represents an alkyl group having from 1 to 6 carbon atoms, a phenyl group, or a cycloalkyl group, and wherein (B) comprises a cis-polybutadiene solution obtained by a step of adding a cis-1,4-polymerization catalyst to 1,3-butadiene, thereby subjecting 1,3-butadiene to cis-1,4-polymerization.

6. The process according to claim 5, wherein the 1,2-polymerization catalyst comprises, based on the resulting cis-polybutadiene solution, 0.1 to 50 mmol of the organoaluminum compound per mole of 1,3-butadiene and 0.01 to 10 mmol/L of the carbon disulfide.

7. The process for producing a vinyl-cis-polybutadiene rubber according to claim 5, including a step of dissolving at least one member selected from the group consisting of previously polymerized polyisoprene, liquid polyisoprene, crystalline polybutadiene having a melting point of not higher than 150° C., liquid polybutadiene, a styrene-isoprene-styrene compound, and derivatives thereof in the mixture containing 1,3-butadiene and cyclohexane solvent as the major components prior to initiation of the 1,2-polymerization in step (A)(2).

8. A process for producing a vinyl-cis-polybutadiene rubber, which comprises mixing (A) and (B), wherein (A) comprises a vinyl-cis-polybutadiene solution where a proportion (HI) of a boiling n-hexane insoluble matter of the vinyl-cis-polybutadiene is from 30 to 60% by weight, the vinyl-cis-polybutadiene being obtained by (1) dissolving cis-polybutadiene containing 80% or more of a cis-1,4-bond and having a Mooney viscosity (ML$_{1+4}$ at 100° C.) of from 20 to 80 in a mixture containing 1,3-butadiene and a cyclohexane solvent as the major components to obtain a resulting cis-polybutadiene solution, and wherein the cis-polybutadiene comprises a single kind or a blend of two or more kinds of cis-polybutadiene obtained by polymerization of 1,3-butadiene with a soluble cobalt catalyst, a nickel catalyst, or a lanthanoid catalyst, and (2) a step of exposing a 1,2-polymerization catalyst to the resulting cis-polybutadiene solution, thereby subjecting the 1,3-butadiene to 1,2-polymerization, wherein the 1,2-polymerization catalyst comprises a soluble cobalt compound, an organoaluminum compound represented by the general formula AlR$_3$, and carbon disulfide, and wherein R represents an alkyl group having from 1 to 6 carbon atoms, a phenyl group, or a cycloalkyl group, and wherein (B) comprises a cis-polybutadiene solution obtained by a step of dissolving cis-polybutadiene containing 80% or more of a cis-1,4-bond and having a Mooney viscosity (ML$_{1+4}$ at 100° C.) of from 20 to 80 in a mixture containing 1,3-butadiene and/or cyclohexane solvent as a major component, wherein the cis-polybutadiene comprises a single kind or a blend of two or more kinds of cis-polybutadiene obtained by polymerization of 1,3-butadiene with a soluble cobalt catalyst, a nickel catalyst, or a lanthanoid catalyst.

9. The process according to claim 8, wherein the 1,2-polymerization catalyst comprises, based on the resulting cis-polybutadiene solution, 0.1 to 50 mmol of the organoaluminum compound per mole of 1,3-butadiene and 0.01 to 10 mmol/L of the carbon disulfide.

10. A rubber composition for tire sidewalls comprising 100 parts by weight of a rubber component made of (a) from 20 to 80% by weight of a vinyl-cis-polybutadiene rubber resulting from solution mixing (A) and (B), wherein (A) comprises vinyl-cis-polybutadiene obtained by (1) a step of adding a cis-1,4-polymerization catalyst comprising an organoaluminum compound and a soluble cobalt compound to a mixture containing 1,3-butadiene and a cyclohexane solvent as the major components and having an adjusted water content, thereby subjecting the 1,3-butadiene to cis-1,4-polymerization to form a resulting polymerization reaction mixture, and subsequently, (2) a step of exposing a second catalyst to the resulting polymerization reaction mixture, thereby subjecting the 1,3-butadiene to 1,2-polymerization, wherein the second catalyst comprises a soluble cobalt compound, an organoaluminum compound represented by the general formula AlR$_3$, and carbon disulfide, wherein R represents an alkyl group having from 1 to 6 carbon atoms, a phenyl group, or a cycloalkyl group, wherein a proportion (HI) of a boiling n-hexane insoluble matter of the vinyl-cis-polybutadiene is from 30 to 60% by weight, and wherein (B) comprises cis-polybutadiene obtained by a step of adding said cis-1,4-polymerization catalyst to 1,3-butadiene to subject 1,3-butadiene to cis-1,4-polymerization, and (b) from 80 to 20% by weight of a diene-based rubber other than (a); and the rubber composition further comprising (c) from 25 to 60 parts by weight of a rubber reinforcing agent.

11. The rubber composition according to claim 10, wherein the rubber reinforcing agent (c) is carbon black.

12. The rubber composition according to claim 10 wherein the diene-based rubber (b) other than (a) is a natural rubber and/or polyisoprene.

13. A silica compounded rubber composition for tires comprising 100 parts by weight of a rubber component made of (a) from 20 to 80% by weight of a vinyl-cis-polybutadiene rubber resulting from solution mixing (A) and (B), wherein (A) comprises vinyl-cis-polybutadiene obtained by (1) a step of adding a cis-1,4-polymerization catalyst comprising an organoaluminum compound and a soluble cobalt compound to a mixture containing 1,3-butadiene and a cyclohexane solvent as the major components and having an adjusted water content, thereby subjecting the 1,3-butadiene to cis-1,4-polymerization to provide a resulting polymerization reaction mixture, and subsequently, (2) a step of exposing a second catalyst to the resulting polymerization reaction mixture thereby subjecting the 1,3-butadiene to 1,2-polymerization, the second catalyst comprising a soluble cobalt compound, an organoaluminum compound represented by the general formula AlR$_3$, and carbon disulfide, wherein R represents an alkyl group having from 1 to 6 carbon atoms, a phenyl group, or a cycloalkyl group, and wherein a proportion (HI) of a boiling n-hexane insoluble matter of the vinyl-cis-polybutadiene is from 30 to 60% by weight, and (B) cis-polybutadiene obtained by a step of adding said cis-1,4-polymerization catalyst to 1,3-butadiene, thereby subjecting the 1,3-butadiene to cis-1,4-polymerization, and (b) from 80 to 20% by weight of a diene-based rubber other than (a); and the silica compound rubber composition further comprising (c) from 40 to 100 parts by weight of a rubber reinforcing agent containing 40% or more of silica.

14. The rubber composition according to claim 13, wherein the diene-based rubber (b) other than (a) is a natural rubber and/or polyisoprene and/or a styrene-butadiene rubber.

15. A rubber composition for passenger automobile tires comprising 100 parts by weight of a rubber component made of (a) from 10 to 50% by weight of a vinyl-cis-polybutadiene rubber resulting from solution mixing (A) vinyl-cis-polybutadiene obtained by (1) a step of adding a cis-1,4-polymerization catalyst comprising an organoaluminum compound and a soluble cobalt compound to a mixture containing 1,3-butadiene and a cyclohexane solvent as the major components and having an adjusted water content, thereby subjecting the 1,3-butadiene to cis-1,4-polymerization to provide a resulting polymerization reaction mixture, and subsequently, (2) a step of exposing the resulting polymerization reaction mixture to a second catalyst, thereby subjecting the 1,3-butadiene to 1,2-polymerization, the second catalyst comprising a soluble cobalt compound, an organoaluminum compound represented by the general formula AlR$_3$, and carbon disulfide, wherein R represents an alkyl group having from 1 to 6 carbon atoms, a phenyl group, or a cycloalkyl group, wherein a proportion (HI) of a boiling n-hexane insoluble matter of the vinyl-cis-polybutadiene is from 30 to 60% by weight, and (B) cis-polybutadiene obtained by a step of adding said cis-1,4-polymerization catalyst to 1,3-butadiene, thereby subjecting the 1,3-butadiene to cis-1,4-polymerization, (d) from 30 to 70% by weight of a styrene-butadiene rubber, and (b) from 0 to 60% by weight of a diene-based rubber other than (a) and (d); and the rubber composition further comprising (c) from 40 to 100 parts by weight of a rubber reinforcing agent.

16. A rubber composition for tire cord coating comprising 100 parts by weight of a rubber component made of (a) from 10 to 60% by weight of a vinyl-cis-polybutadiene rubber resulting from solution mixing (A) vinyl-cis-polybutadiene obtained by (1) a step of adding a cis-1,4-polymerization catalyst comprising an organoaluminum compound and a soluble cobalt compound to a mixture containing 1,3-butadiene and a cyclohexane solvent as the major components and having an adjusted water content, thereby subjecting the 1,3-butadiene to cis-1,4-polymerization to provide a resulting polymerization reaction mixture, and subsequently, (2) a step of exposing a second catalyst to the resulting polymerization reaction mixture, thereby subjecting 1,3-butadiene to 1,2-polymerization, wherein the second catalyst comprises a soluble cobalt compound, an organoaluminum compound represented by the general formula AlR$_3$, and carbon disulfide, wherein R represents an alkyl group having from 1 to 6 carbon atoms, a phenyl group, or a cycloalkyl group, wherein a proportion (HI) of a boiling n-hexane insoluble matter of the vinyl-cis-polybutadiene is from 30 to 60% by weight, and (B) cis-polybutadiene obtained by a step of adding said cis-1,4-polymerization catalyst to 1,3-butadiene, thereby subjecting the 1,3-butadiene to cis-1,4-polymerization, and (b) from 90 to 40% by weight of a diene-based rubber other than (a); and the rubber composition further comprising (c) from 30 to 80 parts by weight of a rubber reinforcing agent.

17. A rubber composition for tire base treads comprising 100 parts by weight of a rubber component made of (a) from 20 to 80% by weight of a vinyl-cis-polybutadiene rubber resulting from solution mixing (A) vinyl-cis-polybutadiene obtained by (1) a step of adding a cis-1,4-polymerization catalyst comprising an organoaluminum compound and a soluble cobalt compound to a mixture containing 1,3-butadiene and a cyclohexane solvent as the major components and having an adjusted water content, thereby subjecting the 1,3-butadiene to cis-1,4-polymerization to provide a resulting polymerization reaction mixture, and subsequently, (2) a step of exposing a second catalyst to the resulting polymerization reaction mixture, thereby subjecting the 1,3-butadiene to 1,2-polymerization, the second catalyst comprising a soluble cobalt compound, an organoaluminum compound represented by the general formula AlR$_3$, and carbon disulfide, wherein R represents an alkyl group having from 1 to 6 carbon atoms, a phenyl group, or a cycloalkyl group, wherein a proportion (HI) of a boiling n-hexane insoluble matter of the vinyl-cis-polybutadiene is from 30 to 60% by weight, and (B) cis-polybutadiene obtained by a step of adding said cis-1,4-polymerization catalyst to 1,3-butadiene, thereby subjecting the 1,3-butadiene to cis-1,4-polymerization, and (b) from 80 to 20% by weight of a diene-based rubber other than (a); and the rubber composition further comprising (c) from 22 to 55 parts by weight of a rubber reinforcing agent.

18. A high-hardness compounded rubber composition comprising 100 parts by weight of a rubber component made of (a) from 20 to 80% by weight of a vinyl-cis-polybutadiene rubber resulting from solution mixing (A) vinyl-cis-polybutadiene obtained by (1) a step of adding a cis-1,4-polymerization catalyst comprising an organoaluminum compound and a soluble cobalt compound to a mixture containing 1,3-butadiene and a cyclohexane solvent as the major components and having an adjusted water content, thereby subjecting the 1,3-butadiene to cis-1,4-polymerization to provide a resulting polymerization reaction mixture, and subsequently, (2) a step of exposing a second catalyst to the resulting polymerization reaction mixture, the second catalyst comprising a soluble cobalt compound, an organoaluminum compound represented by the general formula $AlR_3$, and carbon disulfide, wherein R represents an alkyl group having from 1 to 6 carbon atoms, a phenyl group, or a cycloalkyl group, and wherein a proportion (HI) of a boiling n-hexane insoluble matter of the vinyl-cis-polybutadiene is from 30 to 60% by weight, and (B) cis-polybutadiene obtained by a step of adding said cis-1,4-polymerization catalyst to 1,3-butadiene, thereby subjecting the 1,3-butadiene to cis-1,4-polymerization, and (b) from 80 to 20% by weight of a diene-based rubber other than (a); and the compounded rubber composition further comprising (c) from 60 to 100 parts by weight of a rubber reinforcing agent.

19. A rubber composition for large-sized vehicle tires comprising 100 parts by weight of a rubber component made of (a) from 10 to 60% by weight of a vinyl-cis-polybutadiene rubber resulting from solution mixing (A) vinyl-cis-polybutadiene obtained by (1) a step of adding a cis-1,4-polymerization catalyst comprising an organoaluminum compound and a soluble cobalt compound to a mixture containing 1,3-butadiene and a cyclohexane solvent as the major components and having an adjusted water content, thereby subjecting the 1,3-butadiene to cis-1,4-polymerization to obtain a resulting polymerization reaction mixture, and subsequently, (2) a step of exposing a second catalyst to the resulting polymerization reaction mixture, thereby subjecting the 1,3-butadiene to 1,2-polymerization, wherein the second catalyst comprises a soluble cobalt compound, an organoaluminum compound represented by the general formula $AlR_3$, and carbon disulfide, wherein R represents an alkyl group having from 1 to 6 carbon atoms, a phenyl group, or a cycloalkyl group, wherein a proportion (HI) of a boiling n-hexane insoluble matter of the vinyl-cis-polybutadiene is from 30 to 60% by weight, and (B) cis-polybutadiene obtained by a step of adding said cis-1,4-polymerization catalyst to 1,3-butadiene, thereby subjecting the 1,3-butadiene to cis-1,4-polymerization, and (b) from 90 to 40% by weight of a diene-based rubber other than (a); and the rubber composition further comprising (c) from 45 to 70 parts by weight of a rubber reinforcing agent.

* * * * *